(12) United States Patent
Golden et al.

(10) Patent No.: US 7,767,175 B2
(45) Date of Patent: Aug. 3, 2010

(54) AMMONIA SCR CATALYST AND METHOD OF USING THE CATALYST

(75) Inventors: Stephen J. Golden, Santa Barbara, CA (US); Svetlana Iretskaya, Paris (FR)

(73) Assignee: Catalytic Solutions, Inc., Ventura, CA (US)

( * ) Notice: Subject to any disclaimer, the term of this patent is extended or adjusted under 35 U.S.C. 154(b) by 0 days.

(21) Appl. No.: 12/500,322

(22) Filed: Jul. 9, 2009

(65) Prior Publication Data

US 2009/0304566 A1    Dec. 10, 2009

Related U.S. Application Data

(63) Continuation-in-part of application No. 12/313,501, filed on Nov. 20, 2008, which is a continuation of application No. 11/651,290, filed on Jan. 9, 2007, now Pat. No. 7,527,776.

(51) Int. Cl.
*B01D 53/56* (2006.01)
*B01D 53/86* (2006.01)
*B01D 53/94* (2006.01)
*F01N 3/20* (2006.01)

(52) U.S. Cl. ............... 423/213.2; 423/239.1; 423/239.2; 423/245.3; 423/215.5; 422/168; 422/177; 422/180; 60/299; 60/301

(58) Field of Classification Search ............... 423/213.2, 423/239.1, 239.2, 245.3, 215.5; 60/299, 60/301; 422/168, 177, 180

See application file for complete search history.

(56) References Cited

U.S. PATENT DOCUMENTS

| 4,004,875 | A | 1/1977 | Zink et al. |
| 4,160,805 | A | 7/1979 | Inaba et al. |
| 4,510,265 | A | 4/1985 | Hartwig |
| 4,759,918 | A | 7/1988 | Homeier et al. |
| 4,833,113 | A | 5/1989 | Imanari et al. |

(Continued)

FOREIGN PATENT DOCUMENTS

WO        2006044764        4/2006

(Continued)

OTHER PUBLICATIONS

Eranen, et al., "Enhancement of the catalytic activity of Cu-ZSM-5 for nitric oxide decomposition by introduction of copper during the zeolite synthesis," Applied Catalysis B: Environmental, vol. 4, 1994, pp. 213-223.

(Continued)

*Primary Examiner*—Timothy C Vanoy
(74) *Attorney, Agent, or Firm*—William J. McNichol, Jr.; Reed Smith LLP

(57) ABSTRACT

A DPF with an SCR catalyst and a method for selectively reducing nitrogen oxides with ammonia, filtering particulates, and reducing the ignition temperature of soot on a DPF are provided. The catalyst includes a first component of copper, chromium, cobalt, nickel, manganese, iron, niobium, or mixtures thereof, a second component of cerium, a lanthanide, a mixture of lanthanides, or mixtures thereof, and a component characterized by increased surface acidity. The catalyst may also include strontium as an additional second component. The catalyst selectively reduces nitrogen oxides to nitrogen with ammonia and oxidizes soot at low temperatures. The catalyst has high hydrothermal stability.

28 Claims, 14 Drawing Sheets

U.S. PATENT DOCUMENTS

| | | | |
|---|---|---|---|
| 4,900,517 | A | 2/1990 | Domesle et al. |
| 4,912,776 | A | 3/1990 | Alcorn |
| 4,961,917 | A | 10/1990 | Byrne |
| 5,100,632 | A | 3/1992 | Dettling et al. |
| 5,413,699 | A | 5/1995 | Chou |
| 5,505,919 | A | 4/1996 | Morii et al. |
| 5,589,147 | A | 12/1996 | Farnos et al. |
| 5,681,788 | A | 10/1997 | Kanesaka et al. |
| 5,840,649 | A | 11/1998 | Ichiki et al. |
| 5,900,222 | A | 5/1999 | Ito et al. |
| 5,911,956 | A | 6/1999 | Viel Lamare et al. |
| 5,964,908 | A | 10/1999 | Malina |
| 5,988,115 | A | 11/1999 | Anderson et al. |
| 6,013,599 | A | 1/2000 | Manson |
| 6,089,855 | A | 7/2000 | Becker et al. |
| 6,284,211 | B1 | 9/2001 | Miyadera et al. |
| 6,383,463 | B1 | 5/2002 | Mochida et al. |
| 6,485,289 | B1 | 11/2002 | Kelly et al. |
| 6,609,483 | B1 | 8/2003 | Albrecht et al. |
| 6,677,264 | B1 | 1/2004 | Klein et al. |
| 6,756,336 | B2 | 6/2004 | Kasahara et al. |
| 6,780,805 | B2 | 8/2004 | Faber et al. |
| 6,971,336 | B1 | 12/2005 | Chojnacki et al. |
| 7,084,086 | B2 | 8/2006 | Kasahara et al. |
| 7,527,776 | B2 | 5/2009 | Golden et al. |
| 2001/0022956 | A1 | 9/2001 | Okamoto et al. |
| 2002/0016259 | A1 | 2/2002 | Yoshikawa |
| 2003/0083193 | A1 | 5/2003 | Takaya et al. |
| 2004/0141898 | A1* | 7/2004 | Kelkar et al. ............. 423/239.1 |
| 2005/0159304 | A1 | 7/2005 | Ichiki et al. |
| 2006/0021910 | A1 | 2/2006 | Yaluris et al. |
| 2006/0029535 | A1 | 2/2006 | Ott |
| 2006/0039843 | A1 | 2/2006 | Patchett et al. |
| 2006/0120936 | A1 | 6/2006 | Alive et al. |
| 2006/0155102 | A1 | 7/2006 | Lindall et al. |
| 2006/0159607 | A1 | 7/2006 | Ott |
| 2006/0182676 | A1 | 8/2006 | Tran et al. |
| 2006/0217579 | A1 | 9/2006 | Bailey |
| 2006/0228283 | A1 | 10/2006 | Malyala et al. |
| 2007/0180760 | A1 | 8/2007 | Zhou et al. |
| 2007/0269359 | A1 | 11/2007 | Fisher et al. |
| 2007/0274889 | A1* | 11/2007 | Nakatsuji et al. ......... 423/213.2 |

FOREIGN PATENT DOCUMENTS

| | | |
|---|---|---|
| WO | 2008085265 | 7/2008 |

OTHER PUBLICATIONS

Li, et al., "Selective catalytic reduction of nitric oxide by methane over cerium and silver ion-exchanged ZSM-5 zeolites," Applied Catalysis A: General, vol. 165, 1997, pp. 15-34.

Meunier, et al., "Mechanistic differences in the selective reduction of NO by propene over cobalt- and silver-promoted alumina catalysts: kinetic and in situ Drifts study," Catalysis Today, vol. 59, 2000, pp. 287-304.

Miyadera, "Selective reduction of NOx by ethanol on catalysts composed of Ag/Al2O3 and Cu/TiO2 without formation of harmful by-products," Applied Catalysis B: Environmental, vol. 16, 1998, pp. 155-164.

Flytzani-Stephanopoulos, et al., "Direct Catalytic Decomposition of Nitric Oxide," prepared for U.S. Department of Energy, Jun. 15, 1995.

Yang, et al., "Ion-exchanged pillared clays for selective catalytic reduction of NO by ethylene in the presence of oxygen," Applied Catalysis B: Environmental, vol. 19, 1998, pp. 289-304.

Lee, et al., "Evaluation of Cu-Based SCR/DPF Technology for Diesel Exhaust Emission Control," SAE Paper 2008-01-0072, SAE International 2008, pp. 75-80.

Maaskant for CRI/Criterion Catalyst Co., "The Shell Denox System (SDS) for Nitric Acid Plants," Nitrogen 2005, Bucharest, Romania.

Maaskant for CRI Catalyst Company—Environmental Catalyst and Systems, "The Shell System for NOx Removal and Dioxin Destruction from Incineration Flue Gas," 3rd International Symposium on Incineration and Flue Gas Treatment Technologies, Jul. 2001, Brussels.

* cited by examiner

AMMONIA SCR CATALYST AND METHOD OF USING THE CATALYST

CROSS REFERENCE

The present application claims priority to and is a continuation-in-part of application Ser. No. 12/313,501, filed Nov. 20, 2008, which is itself a continuation of application Ser. No. 11/651,290, filed on Jan. 9, 2007, and issuing as U.S. Pat. No. 7,527,776, the entire contents of both applications which are incorporated herein by reference, including any references cited therein.

FIELD OF THE INVENTION

The invention relates to an apparatus and a method for simultaneous selective catalytic reduction of nitrogen oxides with ammonia and soot oxidation/removal from lean burn fuel exhaust.

BACKGROUND

Diesel engines normally operate at air to fuel ratios above stoichiometric. Emissions of nitrogen oxides and particulates from diesel-fueled vehicles may be significant. Emissions from diesel vehicles are subject to regulation in both the United States and Europe.

Both the United States and Europe have enacted regulations with strict limits on nitrogen oxides ($NO_x$) and particulate matter (PM) emissions from diesel engines. As of 2007, the PM limit for US trucks was 0.01 g/bhp-hr, and the NOx limit was about 2 g/bhp-hr. For the 2010 standard, the PM limits are the same, however the $NO_x$ limit has been reduced almost 10 times. In the 2010 standard, the $NO_x$ limit is 0.2 g/bhp-hr for $NO_x$ will take full effect. Starting in 2011, engines for non-road applications will have to change their emission limits to 0.02-0.03 g PM/bhp-hr and 0.4 g$NO_x$/bhp-hr. All off-road engines with higher than 56 kW power output should meet these standards in 2014.

Nitrogen oxides are also present in exhaust gases from stationary sources such as power plants, industrial processes, gas turbines, etc.

One method of removing $NO_x$ in exhaust gas is to contact the exhaust stream with a reductant such as ammonia in the presence of a catalyst at elevated temperature. The catalyzed reaction of the reductant with $NO_x$ is referred to as selective catalytic reduction (SCR). Urea, ammonium hydroxide, ammonium formate, and other nitrogen-containing chemicals can also be used as a source of ammonia.

Traditional ammonia SCR catalysts are based on vanadia/titania. Imanari, et al. (U.S. Pat. No. 4,833,113), for example, describe an SCR catalyst comprising an oxide of titanium, an oxide of tungsten, and an oxide of vanadium. Vanadia/titania ammonia SCR catalysts normally operate at a temperature of approximately 250-370° C. Exhaust gas from light duty diesel vehicles is normally at a temperature of approximately 200° C. or less. Vanadia/titania SCR catalysts do not have significant activity at temperatures as low as 200° C.

Byrne (U.S. Pat. No. 4,961,917, assigned to Engelhard Corporation) disclose a method of passing ammonia, nitrogen oxides, and oxygen over iron or copper-promoted zeolite catalysts to selectively catalyze the reduction of the nitrogen oxides. The fresh copper-promoted catalyst has good activity. However, the copper catalyst deactivates significantly when aged. Although the iron catalyst is far more stable than the copper catalyst, it has maximum activity at about 350-500° C., significantly higher than the 200° C. temperatures that occur in many diesel exhaust streams.

$NO_x$ removal may be done using Lean $NO_x$ Trap (LNT) technology or using Selective Catalytic Reduction (SCR) Technology, as are known in the art. SCR is a proven technology which offers a wider temperature range for $NO_x$ removal from lean exhaust compare to LNT. PCT Published Application No. WO 2008/085265 (which describes low temperature selective catalytic reduction) is incorporated by reference. SCR is also less expensive since LNT contains significant amount of Platinum Group Metals (PGM) while SCR catalysts may be PGM-free.

Diesel particulate filters (DPFs) have been used for many years to remove the PM from diesel exhaust stream. PCT Published Application No. WO 2006/044764 (which describes diesel particulate filters) is herein incorporated by reference. The PM may comprise lube oil solids, soot and other carbon particulates, inorganic ash and mixtures thereof. PM accumulates over time within the DPF. The pressure drop through the DPF may increase as the PM levels on the DPF increase. To continue normal operation, a DPF may need to be cleaned and/or regenerated. The lube oil solids and carbon particulates can sometimes be removed from the DPF through combustion. However, the ignition temperature of the carbon particulates is normally about 600° C., and diesel exhaust temperatures are rarely that high. In order to combust the PM, the exhaust gas temperature can be increased by retarding the timing of fuel injection, but at the cost of fuel efficiency. Alternatively, the DPF can be heated with an on-vehicle electric heater, however, heating the electric heater requires energy, with an accompanying fuel efficiency penalty. Further, subjecting the DPF to increased temperature may damage the DPF by thermal cracking, or sintering of PM to the DPF. Finally, the DPF may be removed and regenerated off-vehicle, but this requires downtime for maintenance.

Placing a catalyst on the DPF to lower the oxidation temperature of the PM has recently been attempted in diesel aftertreatment systems. The benefit is that by use of a catalyst, PM may combust at normal exhaust temperatures, alleviating or reducing the need for DPF regeneration. Hartwig (U.S. Pat. No. 4,510,265, incorporated by reference) describes a catalyst comprising a platinum group metal and silver vanadate. The catalyst of Homeier (U.S. Pat. No. 4,759,918, incorporated by reference) comprises platinum, palladium, or rhodium on a sulfur resistant support such as titania or zirconia. Dettling (U.S. Pat. No. 5,100,632, incorporated by reference) utilizes a catalyst that is a mixture of one or more platinum group metals and one or more alkaline earth oxides such as magnesium oxide. The catalysts of Hartwig, Homeier, and Dettling et al. comprise platinum group metals (PGMs). PGMs includes gold, platinum, palladium, rhodium and any mixture thereof. PGM catalysts are typically expensive.

DPFs that contain vanadium catalysts to lower the combustion temperature of the carbon particulates have been described in U.S. Pat. No. 4,900,517 (incorporated by reference). Other vanadium catalysts are discussed in U.S. Pat. No. 6,013,599 (incorporated by reference). Vanadium oxides are volatile and toxic. Further, the high temperatures that are present in the DPF during combustion of the carbon particulates can vaporize the vanadium catalysts on the DPF, potentially leading to health problems in the general populace.

Exhaust gas from motor vehicles and engines such as gas turbines contains nitrogen oxides and particulate matter. Traditionally, the nitrogen oxides in the exhaust gas can be removed by contacting the exhaust gas with reducing agents such as ammonia in the presence of a selective catalytic reduction (SCR) catalyst. The ammonia or other reducing agent reacts with the nitrogen oxides to form nitrogen and water. The particulates are commonly removed with a separate filter. A typical lean burn exhaust aftertreatment system would consist of several subsystems: 1) oxidation catalyst (CO and HC removal and NO to $NO_2$ conversion), 2) $NO_x$ removal system (e.g., SCR catalyst) and 3) particulate matter filter (e.g. diesel particulate filter).

SUMMARY OF THE INVENTION

Embodiments of the present disclosure include an apparatus for reducing NOx in an exhaust stream, comprising a particulate filter and a selective catalytic reduction catalyst disposed on the particulate filter, wherein the catalyst comprises a first component selected from the group consisting of copper, chromium, cobalt, nickel, manganese, iron, niobium, and mixtures thereof, a second component selected from the group consisting of cerium, a lanthanide, a mixture of lanthanides, and mixtures thereof, and at least one material characterized by increased surface acidity. In certain embodiments, the particulate filter comprises a diesel particulate filter and the apparatus further comprises a source of ammonia upstream from the diesel particulate filter, wherein the source of ammonia adds ammonia to the exhaust stream. In still other embodiments, the apparatus comprises a diesel oxidation catalyst upstream from the diesel particulate filter and upstream from the source of ammonia. In some embodiments, the wash-coat loading of the selective catalytic reduction catalyst on the diesel particulate filter comprises from about 5 to about 300 g/L.

Embodiments of the present disclosure also include a method for selective catalytic reduction of pollutants in an exhaust stream, removing particulates from an exhaust stream, and reduction of soot ignition temperature in a particulate filter, comprising adding ammonia to the exhaust stream, and directing the exhaust stream through a particulate filter. In certain embodiments, the particulate filter comprises a selective catalytic reduction catalyst, comprising a first component selected from the group consisting of copper, chromium, cobalt, nickel, manganese, iron, niobium, and mixtures thereof, a second component selected from the group consisting of cerium, a lanthanide, a mixture of lanthanides, and mixtures thereof, and at least one material characterized by increased surface acidity. In further embodiments, the particulate filter is a diesel particulate filter, and the method further comprises introducing the exhaust stream to a diesel oxidation catalyst before adding ammonia to the exhaust stream, wherein the ammonia is added between the diesel oxidation catalyst and the diesel particulate filter. In still other embodiments, the wash-coat loading of the selective catalytic reduction catalyst on the diesel particulate filter comprises from about 5 to about 300 g/L.

DETAILED DESCRIPTION

Figure 1:
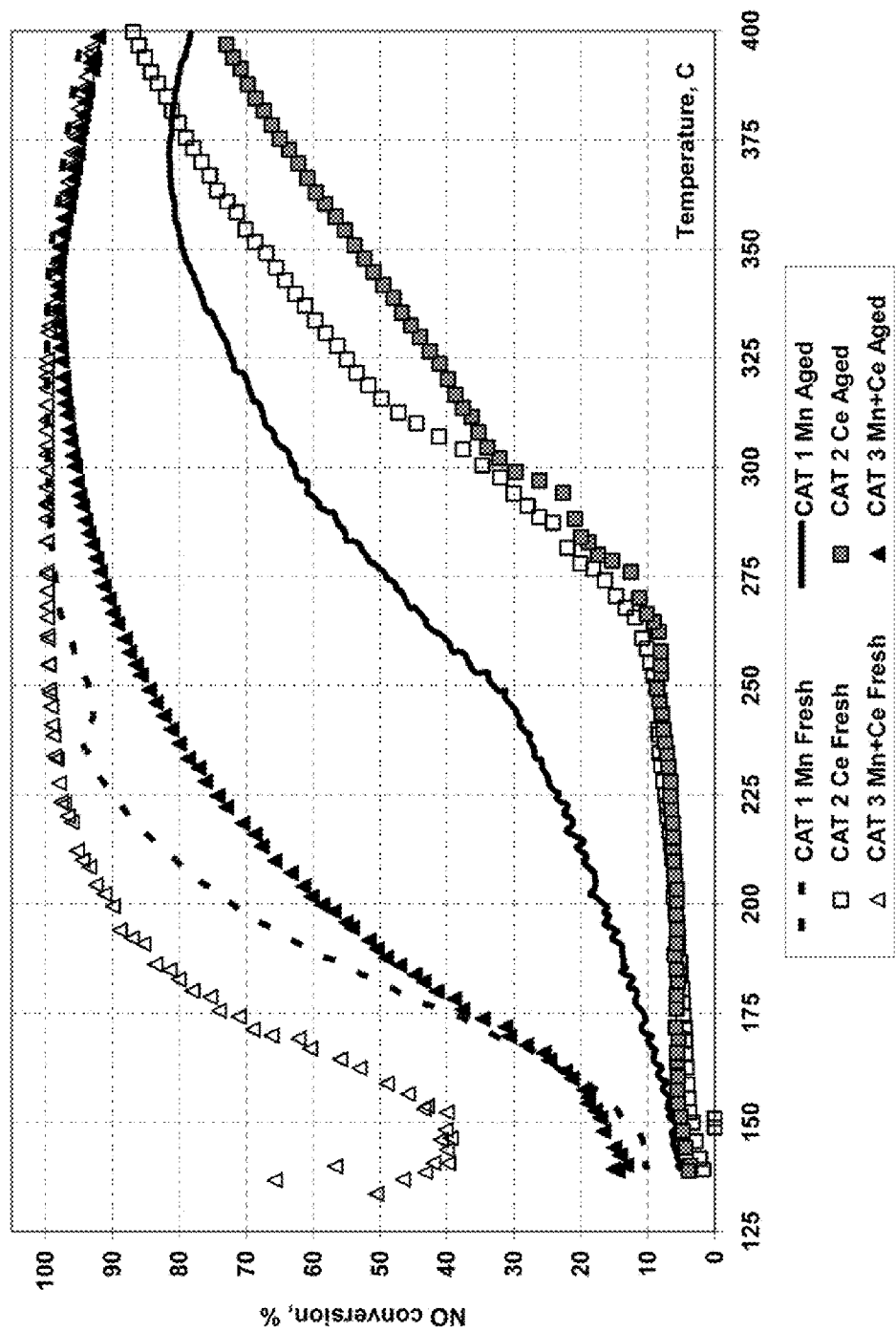
FIG. 1—is a plot showing the percent NO conversion versus temperature in degrees Centigrade, before and after hydrothermal aging, for a catalyst that contains manganese, a catalyst that contains cerium, and a catalyst that contains manganese as a first component and cerium as a second component.

Exhaust gas from motor vehicles and engines such as gas turbines contains nitrogen oxides. The nitrogen oxides in the exhaust gas can be removed by contacting the exhaust gas with reducing agents such as ammonia in the presence of a selective catalytic reduction (SCR) catalyst. The ammonia or other reducing agent reacts with the nitrogen oxides to form nitrogen and water.

Water vapor in the exhaust gas can deactivate the SCR catalyst, lowering the $NO_x$ conversion. Hydrothermal stability of the SCR catalyst is therefore important.

The exhaust gas from light duty diesel engines is at low temperature, approximately 200° C. Low temperature activity of the SCR catalyst is therefore important for diesel engine applications. The SCR catalysts according to embodiments of the present invention have good $NO_x$ conversion activity at low temperatures.

The present invention is directed to a combination selective catalytic reduction catalyst (SCR) and diesel particulate filter. As used herein, this combination may be referred to as SCR-DPF. A catalyst used for a SCR-DPF combined system may be exposed to high temperatures of soot oxidation. Water vapor is part of the exhaust gas, and thus hydrothermal stability of the SCR catalyst is therefore important. It has been surprisingly discovered that the SCR catalyst of the present invention, when combined with a DPF, not only has good SCR activity ($NO_x$ reduction) at low temperatures typical for diesel exhaust but also has the ability to reduce the ignition temperature of carbon particulates (soot). The catalyst of the present invention also has high hydrothermal stability, which is important when exposed to high temperatures of soot combustion.

Placing a SCR catalyst on a DPF is an attractive solution for many exhaust aftertreatment applications. Combined SCR-DPF brings many benefits to aftertreatment systems. The combined SCR-DPF reduces the space necessary for these components. Further, moving the SCR upstream to the DPF exposes the SCR to warmer exhaust, which may cause the SCR to perform more efficiently.

SAE paper 2008-01-0072 *Evaluation of Cu-Based SCR/DPF Technology for Diesel Exhaust Emission Control* discusses a Cu-based combined SCR-DPF. This DPF, however, must be regenerated when it accumulates a critical amount of particulates. Regeneration requires exposure to high temperatures, and this SCR-DPF suffers a significant loss of activity after just a few events of high temperature soot combustion required for regeneration. Cu-based SCR catalysts also form significant amount of $N_2O$, a powerful "greenhouse" gas, during SCR with ammonia.

Catalysts of the SCR-DPF according to embodiments of the present invention have high activity for selective reduction of $NO_x$ with ammonia. Further, the catalysts according to embodiments of the present invention have high $NO_x$ conversion activity at the low temperatures and the high $NO/NO_2$ ratios that are encountered in diesel exhaust. The catalysts according to embodiments of the present invention also have high hydrothermal stability, an important factor in diesel applications. Further, the catalysts according to embodiments of the present invention, when combined with a diesel particulate filter (SCR-DPF) surprisingly and unexpectedly have significant soot oxidation activity at temperatures below typical soot ignition temperatures. It has been discovered that the SCR catalysts described in embodiments of the present disclosure, when combined with a diesel particulate filter (DPF), actually reduces the ignition temperature (balance point temperature) of soot in the DPF. The practical significance of this discovery is that soot may be combusted under normal operating conditions of a diesel engine. The SCR-DPF may not then have to undergo high temperature regeneration, which may prolong the life of the filter and reduce maintenance.

The catalysts according to embodiments of the present invention may have applications to other exhaust streams that contain $NO_x$, particularly to exhaust streams that may contain high $NO/NO_2$ ratios. Some examples of applications include, but are not limited to, exhaust gas from diesel engine powered vehicles, exhaust gas from gas turbines, exhaust gas from diesel generators, exhaust gas from electrical generation plants, exhaust gas from chemical plants, and other suitable applications.

According to Alcorn (U.S. Pat. No. 4,912,726), it is believed that the reduction of NO requires the presence of oxygen, while the reduction of $NO_2$ does not. Alcorn also asserts that the reduction of $NO_2$ is easier to carry out than the reduction of NO.

Alcorn states that the evidence seems to support a two-step process for the ammonia-SCR process, where the following reactions occur in parallel:

$$NO + \tfrac{1}{2}O_2 \rightarrow NO_2 \quad (1)$$

$$6NO_2 + 8NH_3 \rightarrow 7N_2 + 12H_2O \quad (2)$$

It is well-known that SCR catalysts have lower activity for $NO_x$ conversion at high $NO/NO_2$ ratios than at low ratios. Only about 5% of the $NO_x$ in diesel offgas is $NO_2$. Low temperature activity of the SCR catalyst at high $NO/NO_2$ ratios is therefore an important factor for diesel applications.

Overall NO reduction by ammonia in the presence of oxygen is very slow reaction at low temperatures:

1. $4NO + 4NH_3 + O_2 \rightarrow 4N_2 + 6H_2O$ (standard SCR reaction) \quad (3)

If $NO_x$ comprises 50% NO and 50% $NO_2$ then $NH_3$ SCR reaction is much faster at low temperatures:

1. $NO + NO_2 + 2NH_3 \rightarrow 2N_2 + 3H_2O$ (fast SCR reaction) \quad (4)

Without wishing to be limited to any particular theory, it is believed that the catalysts of the present invention may oxidize NO to $NO_2$ on active catalytic sites creating conditions for fast SCR reaction, which may lead to improved SCR activity at low temperatures.

Although the $NO/NO_2$ ratio can be lowered by oxidizing the NO in the exhaust gas to $NO_2$ with a diesel oxidation catalyst (DOC), DOC catalysts may not be effective at converting NO to $NO_2$ under the low temperature conditions that may be seen in diesel exhaust. Further, DOC catalysts are often based on platinum and can be expensive. Finally, the DOC may lose its ability to convert NO to $NO_2$ at low temperatures over time due to aging and/or poisoning.

When regenerating a DPF by oxidizing PM, a complex series of reactions may take place. The carbon can be removed from the DPF with the following reactions:

$$C + O_2 = CO_2 \quad (5)$$

$$C + \tfrac{1}{2}O_2 = CO \quad (6)$$

$$C + NO_2 = CO + NO \quad (7)$$

$$C + 2NO_2 = CO_2 + 2NO \quad (8)$$

The reactions of carbon with $NO_2$ (7, 8) may occur more rapidly and at a lower temperature than the reactions of carbon with the $O_2$ (5, 6) in the exhaust gas. High concentrations of $NO_2$ in the exhaust stream may therefore increase both the efficiency and the rate of carbon removal from the DPF.

It is believed that the catalysts of the present invention may oxidize NO to $NO_2$ on active catalytic sites, which may lead to enhanced catalyzed soot oxidation activity by $NO_2$ formed on the surface of the catalyst.

As shown in the examples below, the SCR catalysts according to embodiments of the present invention have higher activity at low temperatures than the catalysts of the prior art at both high and low $NO/NO_2$ ratios. The SCR catalysts of the present invention also have higher hydrothermal stability than the catalysts of the prior art. Diesel exhaust normally contains a significant amount of water. Hydrothermal stability is therefore a major factor for diesel applications.

The examples also show that when applied to a diesel particulate filter, the SCR catalysts of the present invention reduce the soot ignition temperature.

SCR Catalysts

The catalysts of the present invention comprise: a first component comprising at least one of the group consisting of copper, chromium, cobalt, nickel, manganese, iron, niobium, and mixtures thereof; a second component comprising at least one of the group consisting of cerium, a lanthanide, a mixture of lanthanides, and mixtures thereof, and at least one material characterized by increased surface acidity, for example, but not limited to, at least one zeolite. The catalysts may optionally further comprise strontium as an additional second component. The catalysts may also preferably comprise an oxygen storage material ("OSM"). Oxygen storage materials may generally be cerium oxide-based materials, as described in more detail below.

As shown in the Examples below, the first component and the second component of the catalysts according to embodiments of the present invention may have a synergistic effect on one another. The synergistic effect may help to provide high $NO_x$ conversion at low temperature and high $NO/NO_2$ ratios. The synergy between the first component and the second component may also help to stabilize the catalysts toward hydrothermal aging. The optional strontium additional second component may further enhance the NO conversion of the catalysts according to embodiments of the present invention.

First Component

The first component of the catalyst according to embodiments of the present invention may comprise at least one of copper, chromium, cobalt, nickel, manganese, iron, niobium, and mixtures thereof. Manganese is an exemplary first component.

The catalyst of the present invention may comprise approximately 1 to approximately 20 weight percent of the first component, more preferably approximately 3 to approximately 15 weight percent of the first component, and most preferably approximately 5 to approximately 8 weight percent of the first component, where the weight percent of the first component is calculated on the basis of the metal.

The first component may be formed from nitrate precursors that convert into oxides after calcination. Some of the metals of the first component may form multiple oxides. Manganese may form, for example, but not limited to, $MnO$, $Mn_2O_3$, and $Mn_3O_4$. Thus, for the purposes of the embodiments herein, the first component is calculated on the basis of the weight of the metal of the first component alone, and not the full metal oxide. As used herein for other components of embodiments of the present disclosure, "calculated on the basis of the metal" shall have the same meaning.

Second Component

The second component of the catalyst according to embodiments of the present invention may comprise at least one component selected from the group consisting of cerium, a lanthanide, a mixture of lanthanides, and mixtures thereof. Cerium is an exemplary second component.

The catalyst of the present invention may comprise approximately 2 to approximately 35 weight percent of the second component, more preferably approximately 5 to approximately 25 weight percent of the second component, and most preferably approximately 8 to approximately 15 weight percent of the second component, where the weight percentage of the second component is calculated on the basis of the metal.

Strontium Component

The catalyst according to embodiments of the present invention may also comprise a strontium second component in addition to, or as a partial replacement for, the second component selected from the group consisting of cerium, a lanthanide, a mixture of lanthanides, and mixtures thereof.

If the catalyst according to embodiments of the present invention comprises a strontium second component, the catalyst may comprise approximately 2 to approximately 35 weight percent of the strontium second component, more preferably approximately 5 to approximately 25 weight percent of the strontium second component, and most preferably approximately 8 to approximately 15 weight percent of the strontium second component, where the weight percent of the strontium second component is on the basis of strontium metal.

Component Characterized by Increased Surface Acidity

The catalyst according to embodiments of the present invention may comprise at least one component characterized by increased acidity of the surface. Surface Acidity may be required for SCR reactions because the acids are sites for ammonia adsorption. In heterogeneous catalysis, adsorption reagents on catalytic surface may be an essential step of the process. The acidic surface materials may include metal oxide materials such as aluminum, silicon, titanium or zirconium oxides which have surface properties modified by treatment with materials containing sulfur, tungsten, phosphorus, silicon, titanium, or molybdenum, or any other materials which could modify surface acidity. For example, but not limited to, sulfated, tungstated or phosphated zirconias, silica-alumina or silica-titania. In further embodiments, the at least one component characterized by increased surface activity includes a zeolite.

The catalyst according to embodiments of the present invention may comprise at least one zeolite. The zeolite may be selected from the group consisting of ZSM-5, zeolite beta, a ZSM-type zeolite, a MCM-type zeolite, mordenite, faujasite, ferrierite, and mixtures thereof. In an embodiment, the zeolite may be selected from the group consisting of ZSM-5, ZSM-11, ZSM-12, ZSM-18. ZSM-23, a MCM-zeolite, zeolite beta, and mixtures thereof. ZSM-5 may be an exemplary zeolite for use as a component in the catalysts according to embodiments of the present invention.

The zeolite or mixture of zeolites may be in the H-form, the Na-form, the ammonium-form, or mixtures thereof. The H-form of the zeolite may be an exemplary form of the zeolite or mixture of zeolites.

The component characterized by increased surface acidity may be exchanged, all or in part, with the first component and/or the second component.

The zeolite may also be exchanged, all or in part, with the first component and/or the second component. The $SiO_2/Al_2O_3$ ratio of the zeolite may be in a range of approximately 1 to approximately 500, more preferably approximately 10 to approximately 150, and most preferably approximately 30 to approximately 70. Although not wishing to be bound by a theory, it is believed that zeolites having a $SiO_2/Al_2O_3$ ratio greater than approximately 10 may be beneficial in enhancing the hydrothermal stability of the catalysts. A $SiO_2/Al_2O_3$ ratio of approximately 40 may be an exemplary ratio.

In an embodiment, all or part of the first component, the second component, or both the first component and the second component may be impregnated or exchanged into the component or mixture of components characterized by increased surface acidity. In an embodiment, part of the first component and/or the second component may be exchanged into the component or mixture of components characterized by increased surface acidity, and part of the first component and/or the second component may be impregnated into the component or mixture of components characterized by increased surface acidity.

In an embodiment, all or part of the first component, the second component, or both the first component and the second component may be impregnated or exchanged into the zeolite or mixture of zeolites. In an embodiment, part of the first component and/or the second component may be exchanged into the zeolite or mixture of zeolites, and part of the first component and/or the second component may be impregnated into the zeolite or mixture of zeolites.

Zeolites and other materials characterized by increased surface acidity may include cations in their structure, for example, but not limited to $H^+$, or $NH_4^+$, or $Na^+$. Those cations may be "exchanged" with other metals. An exchange results in the metal replacing the original cation in the structure, and thus it becomes part of zeolite or other materials characterized by increased surface acidity. Impregnating, on the other hand, is a simple placement of the metal on the surface of structure. The metal does not become a part of zeolite or other materials characterized by increased surface acidity, similar to the placing of metals on alumina or silica, etc.

The catalyst may comprise approximately 10 to 90 weight percent acidic surface material, more preferably approximately 20 to approximately 90 weight percent acidic surface material, and most preferably approximately 40 to approximately 80 weight percent acidic surface material. The acidic surface material may also be a mixture of such materials listed above.

The catalyst may comprise approximately 10 to 90 weight percent zeolite, more preferably approximately 20 to approximately 90 weight percent zeolite, and most preferably approximately 40 to approximately 80 weight percent zeolite. The zeolite may also be a mixture of zeolites.

Oxygen Storage Material

An oxygen storage material may be an optional component of the catalyst according to embodiments of the present invention. It is generally preferred that the catalysts of the present invention comprise at least one oxygen storage material. Oxygen storage materials may generally comprise a cerium-oxide-based material. Oxygen storage materials can take tip oxygen from oxygen-rich feed streams and give up oxygen to oxygen-deficient feedstreams. The oxygen storage material may also be a support for the first component and/or the second component.

The total surface area of cerium oxide-based materials may generally decrease when the cerium oxide-based materials are heated to temperatures of 800° C. or more. One or more metal oxides may be added to the cerium oxide-based material to decrease the degree of sintering of the cerium oxide-based material during exposure to high temperatures. The preferred metal oxides that can be added to the cerium oxide-based materials may be, for example, one or more of $ZrO_2$, $Al_2O_3$, $La_2O_3$, or other rare earth metal oxide. Rare earth metals are defined as scandium and yttrium and the elements with atomic numbers 57 through 71. For the purposes of this application, yttrium oxide is considered to be a rare earth oxide. In one embodiment of the present invention, the oxygen storage material may be a cerium oxide-based material having a composition with the formula $Ce_{1-a}Zr_aO_2$ or $Ce_{1-c-d}Zr_cLan_dO_2$, where Lan is at least one of Y, La, Pr, Nd, Sm, Eu, Gd, Ho, or Yb.

In an exemplary embodiment, the oxygen storage material in the catalyst according to the present invention may have a formula of $Ce_{0.24}Zr_{0.66}La_{0.04}Y_{0.06}O_2$ (CZLY), $Ce_{0.24}Zr_{0.67}Ln_{0.09}O_2$ (CZL), $Ce_{0.68}Zr_{0.32}O_2$ (CZO), or $Ce_{0.24}Zr_{0.67}Nd_{0.09}O_2$ (CZN). Other oxygen storage materials may also be suitable.

If the catalyst according to embodiments of the present invention comprises at least one oxygen storage material, the catalyst may comprise approximately 10 to approximately 90 weight percent oxygen storage material, more preferably approximately 20 to approximately 70 weight percent oxygen storage material, and most preferably approximately 30 to approximately 60 weight percent oxygen storage material. The weight percent of the oxygen storage material is on the basis of the oxides.

The OSM used for certain embodiments of the present disclosure are provided as mixed oxides, examples of which are described herein. The amount of the OSM is calculated by weight on the basis of the oxides, which is different than how the weight percentage of the first and second component are calculated as described, herein.

Although not wishing to be limited to a theory, it is believed that the oxygen storage material may enhance the performance of the catalysts according to embodiments of the present invention by improving the ability of the catalyst to oxidize NO to $NO_2$. $NO_2$ may react more rapidly with ammonia or other reducing agent than does $NO_x$. Enhancing the ability of the catalyst to oxidize NO to $NO_2$ may therefore improve the activity of the catalyst to catalyze the selective reduction of $NO_x$ with ammonia. The oxygen storage material may also improve the rheology of aqueous slurries for the optional washcoat (described below) that comprise the oxygen storage material.

Inorganic Oxides

The catalyst according to embodiments of the present invention may also comprise at least one inorganic oxide selected from the group consisting of alumina, silica, titania, silica-alumina, and solid solutions, composites, or mixtures thereof. Alumina is an exemplary inorganic oxide for use in the catalyst according to embodiments of the present invention. The inorganic oxides may be used, for example, as part of a washcoat, as described below. The inorganic oxides may be substituted for all or part of the oxygen storage material component. In an embodiment, the sum of the amount of oxygen storage material and the amount of inorganic oxide may be an amount as previously given for the oxygen storage material alone. The other inorganic oxides may be substituted, all or in part, for the oxygen storage material, although the inorganic oxides may have a different function than the oxygen storage material. Inorganic oxides may improve the rheology of aqueous slurries for the optional washcoat and enhance wash-coat adhesion to a substrate, if the catalyst is to be coated on a monolith.

Shaped Catalyst

In an embodiment, the catalyst of the present invention may be molded into a suitable shape such as a honeycomb, pellets, or beads. In another embodiment, the catalyst may be extruded into extrudates.

In an embodiment, the catalyst according to embodiments of the present invention may be formed by milling or mulling at least one of: the first component comprising at least one of the group consisting of oxides or salts or other compounds of copper, chromium, cobalt, nickel, manganese, iron, niobium, and mixtures thereof, the second component comprising at least one of the group consisting of cerium, a lanthanide, a mixture of lanthanides, and mixtures thereof, and the at least one zeolite to form a paste. The optional oxygen storage material and/or the optional strontium second component may also be milled or mulled with any or all of the other components. The remaining components of the catalyst may be added by methods well known to those skilled in the art.

The paste may be extruded through a die to form extrudates. The extrudates may be dried and calcined, thereby forming the catalyst. Other manners of forming shaped catalysts may also be suitable.

To form an extruded wall-flow SCR-DPF the channels of the wall flow filter may be alternately plugged at an inlet and an outlet so that the exhaust gas is forced to flow through the porous walls of the wall flow filter while traveling from the inlet to the outlet of the wall flow filter. The particulates may be deposited onto the CDPF and may thereby be removed from the exhaust gas. Other manners of forming shaped SCR-DPF catalysts may also be suitable.

Catalyst Composition

Advantageously, the catalyst according to embodiments of the present invention may be combined with a substrate to form a catalyst composition. Accordingly, another aspect of the present invention provides a catalyst composition that comprises:

a substrate;

a catalyst comprising:

1. a first component comprising at least one of the group consisting of copper, manganese, iron, chromium, cobalt, nickel, niobium, and mixtures thereof;
2. a second component comprising at least one of the group consisting of cerium, a lanthanide, a mixture of lanthanides, and mixtures thereof, and
3. at least one zeolite.

The catalyst may optionally further comprise at least one oxygen storage material and/or strontium as an additional second component. The catalyst may optionally further comprise an inorganic oxide selected from the group consisting of alumina, silica, titania, silica-alumina, and solid solutions, composites, or mixtures thereof. The inorganic oxide may be part of a washcoat, or the inorganic oxide may be separate from the washcoat. In an exemplary embodiment, the inorganic oxide may be part of the washcoat.

Substrate

As used herein, a substrate may be any support structure known in the art for supporting catalysts. In one embodiment of the present invention, the substrate may be in the form of beads or pellets. The beads or pellets may be formed from alumina, silica alumina, silica, titania, mixtures thereof, or any suitable material. In an exemplary embodiment of the present invention, the substrate may be a honeycomb support. The honeycomb support may be a ceramic honeycomb support or a metal honeycomb support. The ceramic honeycomb support may be formed, for example, from sillimanite, zirconia, petalite, spodumene, magnesium silicates, mullite, alumina, cordierite ($Mg_2Al_4Si_5O_{18}$), other alumino-silicate materials, silicon carbide, or combinations thereof. Other ceramic supports may also be suitable.

If the support is a metal honeycomb support, the metal may be a heat-resistant base metal alloy, particularly an alloy in which iron is a substantial or major component. The surface of the metal support may be oxidized at elevated temperatures above about 1000° C. to improve the corrosion resistance of the alloy by forming an oxide layer on the surface of the alloy. The oxide layer on the surface of the alloy may also enhance the adherence of a washcoat to the surface of the monolith support. Preferably, all of the substrate supports, either metallic or ceramic, offer a three-dimensional support structure.

In one embodiment of the present invention, the substrate may be a monolithic carrier having a plurality of fine, parallel flow passages extending through the monolith. The passages can be of any suitable cross-sectional shapes and sizes. The passages may be, for example, trapezoidal, rectangular, square, sinusoidal, hexagonal, oval, or circular, although other shapes are also suitable. The monolith may contain from about 9 to about 1200 or more gas inlet openings or passages per square inch of cross section, although fewer passages may be used.

The substrate can also be any suitable filter for particulates. Some suitable forms of substrates may include woven filters, particularly woven ceramic fiber filters, wire meshes, disk filters, ceramic honeycomb monoliths, ceramic or metallic foams, wall flow filters, and other suitable filters. Wall flow filters are similar to honeycomb substrates for automobile exhaust gas catalysts. They may differ from the honeycomb substrates that may be used to form normal automobile exhaust gas catalysts in that the channels of the wall flow filter may be alternately plugged at an inlet and an outlet so that the exhaust gas is forced to flow through the porous walls of the wall flow filter while traveling from the inlet to the outlet of the wall flow filter.

In certain embodiments, the substrate includes a diesel particulate filter (DPF), and the filter includes the selective catalytic reduction (SCR) catalyst described herein, or the selective catalytic reduction catalyst is disposed on the diesel particulate filter. As used herein, a diesel particulate filter (DPF) with a selective catalytic reduction (SCR) catalyst disposed thereon may be referred to as a SCR-DPF. The catalyst composition may be placed on the DPF to form the SCR-DPF in any suitable manner. Particulates in the exhaust stream may therefore be deposited onto the SCR-DPF and may thereby be removed from the exhaust gas. The SCR-DPF also operates to convert NOx, and may lower the oxidation temperature of soot and other carbon materials in the PM.

The SCR-DPF may be made from a variety of materials. Materials that withstand high temperatures may be preferable, because burning the particulates on the filter can subject the substrate to high temperatures. Some suitable high temperature materials for forming the substrate of the diesel particulate filter can include, but are not limited to, a metal, alumina, silica alumina, cordierite, silicon nitride, silicon carbide, sodium zirconium phosphate, mullite, and other appropriate high temperature materials known to one skilled in the art. Suitable metals may include, but are not limited to, steels and specialty steels.

Washcoat

In an embodiment, at least a portion of the catalyst of the present invention may be placed on the substrate in the form of a washcoat. The term "washcoat," as used herein, refers to a coating of oxide solids on the substrate or solid support structure. The oxide solids in the washcoat may be one or more carrier material oxides, one or more catalyst oxides, or a mixture of carrier material oxides and catalyst oxides. Carrier material oxides are porous solid oxides that may be used to provide a high surface area for a dispersed phase. Carrier materials are normally stable at high temperatures and under a range of reducing and oxidizing conditions. The zeolite and the oxygen storage material may be oxide solids. The inorganic oxide may also be an oxide solid.

As used herein, the dispersed phase of the carrier metal oxides may comprise the catalyst oxides, which may include at least a first and/or second component.

In an embodiment, a washcoat may be formed on the substrate by suspending the carrier materials in water to form an aqueous slurry and placing (placing includes but is not limited to depositing, adhering, curing, coating, and any known coating processes to coat a film on a substrate) the aqueous slurry on the substrate as a washcoat. The carrier materials in the slurry may comprise the zeolite or the zeolite and the oxygen storage material. In an exemplary embodiment, the oxide solids that comprise the washcoat may comprise optionally the zeolite and/or the oxygen storage material. In an another embodiment the washcoat may further comprise at least one inorganic oxide selected from the group consisting of alumina, silica, titania, silica-alumina, and solid solutions, composites, and mixtures thereof.

Other components such as salts of the first and/or the second components may optionally be added to the aqueous slurry. Other components such as acid or base solutions or various salts or organic compounds may be added to the aqueous slurry to adjust the rheology of the slurry. Some examples of compounds that can be used to adjust the rheology include, but are not limited to ammonium hydroxide, aluminum hydroxide, acetic acid, citric acid, tetraethylammonium hydroxide, other tetraalkylammonium salts, ammonium acetate, ammonium citrate, glycerol, commercial polymers such as polyethylene glycol, and other suitable polymers.

In an embodiment, the first component, the second component, or both the first component and the second component may be added to the aqueous slurry as oxides or other compounds, for example nitrates, acetates or other salts and/or mixture of thereof. The slurry may be placed on the substrate in any suitable manner. For example, the substrate may be dipped into the slurry, or the slurry may be sprayed onto the substrate. Other methods of depositing the slurry onto the substrate known to those skilled in the art may be used in alternative embodiments. If the substrate is a monolithic carrier with parallel flow passages, the washcoat may be formed on the walls of the passages. Gas flowing through the flow passages may contact the washcoat on the walls of the passages as well as materials that are supported on the washcoat. If the substrate is a wall-flow DPF, wash-coat may be deposited inside the porous walls of the substrate.

It is believed that the oxygen storage material may improve the rheology of the washcoat slurry. Such improvement may be seen in process control and/or manufacture of the catalyst. The enhanced rheology of the washcoat slurry that may be due to the presence of the oxygen storage material may enhance the adhesion of the washcoat slurry to the substrate.

In an embodiment of the present invention, a washcoat may be formed by slurry depositing the zeolite and optionally the oxygen storage material onto the substrate. The washcoat may also comprise at least one inorganic oxide selected from the group consisting of alumina, silica, titania, silica-alumina, and solid solutions, composites, and mixtures thereof. A solution comprising water-soluble precursor salts of the first component and/or the second component and/or the optional strontium-second component may be impregnated and/or exchanged into the washcoat after the washcoat is placed on the substrate. In an alternative embodiment, salts of the first and/or the second component and/or the optional strontium second component may be added to the aqueous slurry for the washcoat. In yet another embodiment, at least one of the first component, the second component, and/or the optional strontium second component may be added to the aqueous slurry for the washcoat as oxides.

In an exemplary embodiment of the present invention, a wash-coat may be deposited on high-porosity wall-flow diesel particulate filter (DPF) substrate. A loading of wash-coat on the DPF may be in a range of approximately 5 g/L to approximately 300 g/L, more preferably approximately 50 g/L to approximately 250 g/L, and most preferably approximately 100 g/L to approximately 200 g/L. Higher wash-coat loading should lead to higher hydrothermal stability and overall activity of the SCR-DPF. However too high wash-coat loading may lead to increased back pressure over the SCR-DPF, which may lead to decreased fuel efficiency and other undesirable consequences known to exhaust after-treatment experts.

The substrate, the washcoat, and the impregnated or exchanged solution (comprising water-soluble precursor salts of the first component and/or the second component and/or the optional strontium-second component) may be calcined to form the catalyst composition before or after the washcoat and/or the solution are added to the substrate. In an embodiment, the washcoat and the impregnated or exchanged solution may be dried before calcining.

Other methods of forming the catalyst composition and the wash-coat may also be suitable. Suitable methods of forming the catalyst composition and the wash-coat are known to those skilled in the art.

Combined SCR-DPF

Certain embodiments of the present disclosure include an apparatus for reducing $NO_x$ in an exhaust stream, comprising a particulate filter and a selective catalytic reduction (SCR) catalyst described herein disposed on the particulate filter. In these embodiments, the catalyst comprises at least a first component selected from the group consisting of copper, chromium, cobalt, nickel, manganese, iron, niobium, and mixtures thereof, a second component selected from the group consisting of cerium, a lanthanide, a mixture of lanthanides, and mixtures thereof; and at least one material characterized by increased surface acidity. In some embodiments, the particulate filter is a diesel particulate filter (DPF) and the apparatus is a SCR-DPF. In further embodiments, the apparatus further comprises a source of ammonia upstream from the diesel particulate filter, wherein the source of ammonia adds ammonia to the exhaust stream. In other embodiments, the apparatus further comprises diesel oxidation catalyst (DOC) upstream from the diesel particulate filter (DPF) and also upstream from the source of ammonia, such that the source of ammonia is between the DOC and DPF.

In some embodiments of the apparatus described herein, the SCR catalyst comprises from about 1 to about 20 percent of the first component calculated on the basis of the metal, from about 2 to about 35 percent of the second component calculated on the basis of the metal, and from about 10 to about 90 percent of the material characterized by increased surface acidity. In further embodiments, the wash-coat loading of the selective catalytic reduction catalyst on the diesel particulate filter comprises from about 5 to about 300 g/L.

In one embodiment, the SCR-DPF apparatus may consist of an SCR catalyst comprised of about 1 to about 10 wt % of first component, for example, manganese, about 5 to about 20 wt % of second component, for example, cerium, about 30 to about 60 wt % of material characterized with increased surface acidity, for example, the zeolite ZSM-5, about 10 to about 40 wt % of an oxygen storage material, for example, CZLY, and about 5 to about 20 wt % of inorganic oxide, for example, aluminum oxide. In some embodiments, the SCR catalyst may be placed on high porosity wall-flow filter at amount of about 100 to 200 g per liter of the filter substrate.

In another embodiment, the SCR-DPF apparatus may consist of an SCR catalyst comprised of about 6 wt % of first component, for example, manganese, about 12 wt % of second component, for example, cerium, about 45 wt % of material characterized with increased surface acidity, for example, the zeolite ZSM-5, about 27 wt % of an oxygen storage material, for example, CZLY, and about 10 wt % of inorganic oxide, for example, aluminum oxide. In some embodiments, the SCR catalyst may be placed on high porosity wall-flow filter at amount of approximately 150 g per liter of the filter substrate.

Method for Removing $NO_x$

The exhaust gas may be contacted with the catalyst according to embodiments of the present invention in the presence of ammonia sufficient to reduce the $NO_x$ that is contained in the exhaust gas. The ammonia may normally be introduced into the exhaust gas before the exhaust gas contacts the catalyst according to an embodiment of the present invention. The exhaust gas and the ammonia as a reducing agent may be contacted with the catalyst, thereby reducing the nitrogen oxides in the exhaust gas.

Urea, ammonium hydroxide, ammonium formate, ammonia gas, or any other suitable source of ammonia may be used as a source of ammonia.

The ammonia/$NO_x$ mole ratio may be in a range of approximately 0.3 to approximately 2.5, more preferably in a range of approximately 0.7 to approximately 2, and most preferably in a range of approximately 0.8 to approximately 1.2. Low ammonia/$NO_x$ ratios may generally be preferred in order to minimize excess ammonia in the exhaust gas. Excess ammonia in the exhaust gas may be undesirable due to health or odor issues.

The SCR/DPF is reactor vessel for converting NOx and other exhaust stream components to nitrogen and water. Space time, $\tau$, is the time necessary to process one reactor volume, V, (volume of the SCR/DPF) of fluid (the exhaust gas) based on entrance conditions, including volumetric flow rate $v_0$:

$$\tau \equiv V/v_0 \qquad 1.$$

In other words, the space time is the amount of time that one reactor volume of fluid spends in a reaction vessel. Space time is also called holding time or mean residence time.

Space velocity, SV, is essentially the inverse of space time, but it may be measured at different conditions depending on the reactor:

$$SV \equiv v_0/V \qquad 1.$$

In other words, space velocity measures how many reactor volumes worth of the fluid that passes through the reactor per unit of time. For example, a space velocity of 5,000 $hr^{-1}$ indicates that a reactor is able to process a volume of fluid 5,000 times the volume of the reactor itself per hour.

The space velocity of the exhaust gas and the ammonia passing through the catalyst may be in a range of approximately 5,000 $hr^{-1}$ to approximately 180,000 $hr^{-1}$, more preferably in a range of approximately 15,000 $hr^{-1}$ to approximately 90,000 $hr^{-1}$, and most preferably in a range of approximately 20,000 $hr^{-1}$ to approximately 60,000 $hr^{-1}$.

The exhaust gas and ammonia may be contacted with the catalyst at a temperature of approximately 140° C. to approximately 700° C., more preferably at a temperature of approximately 150° C. to approximately 600° C., and most preferably at a temperature of approximately 170° C. to approximately 500° C.

If the temperature of the exhaust gas is lower than approximately 170° C., the reduction of the nitrogen oxides may be low. At temperatures greater than approximately 400° C., the ammonia may be oxidized. If the ammonia is oxidized, there may be insufficient ammonia reducing agent in the exhaust gas to reduce the nitrogen oxides. Thus, in certain embodiments, the exhaust gas and ammonia may be contacted with the catalyst at a temperature of approximately 170° C. to approximately 400° C.

If excess ammonia is present in the exhaust gas, at least a portion of the excess ammonia may be oxidized to nitrogen by the catalyst according to embodiments of the present invention.

As used herein, "ammonia slip" refers to ammonia which passes through the SCR catalyst without reacting. Ammonia slip may occur, for example, due to excess ammonia in a higher than stoichiometric ratio ($NH_3/NO_x$), or due to low activity of the catalyst. In some cases in order to prevent ammonia slip, impregnation of platinum group metals (PGM) onto the rear area (i.e., the area closest to the outlet) of SCR-DPF can be executed.

Method for Selective Catalytic Reduction of Pollutants and Removal of Particulates in an Exhaust Stream and Reduction of Soot Ignition Temperature in a Particulate Filter Certain embodiments of the present disclosure include a method for selective catalytic reduction of pollutants (e.g. NOx) in an exhaust stream, removing particulates from an exhaust stream, and lowering of soot ignition temperature in a particulate filter. This method includes adding ammonia to the exhaust stream, and directing the exhaust stream through a particulate filter comprising a selective catalytic reduction catalyst (e.g. SCR-DPF). In these embodiments, the selective catalytic reduction catalyst includes a first component selected from the group consisting of copper, chromium, cobalt, nickel, manganese, iron, niobium, and mixtures thereof, a second component selected from the group consisting of cerium, a lanthanide, a mixture of lanthanides, and mixtures thereof, and at least one material characterized by increased surface acidity. In further embodiments, the particulate filter is a diesel particulate filter (SCR-DPF), and the method further comprises introducing the exhaust stream to a diesel oxidation catalyst (DOC) before adding ammonia to the exhaust stream. In these embodiments, the ammonia is added to the exhaust stream after the DOC and before the.

In some embodiments, the selective catalytic reduction catalyst comprises from about 1 to about 20 percent of the first component calculated on the basis of the metal, from about 2 to about 35 percent of the second component calculated on the basis of the metal, and from about 10 to about 90 percent of the material characterized by increased surface acidity. In further embodiments, the wash-coat loading of the selective catalytic reduction catalyst on the diesel particulate filter comprises from about 5 to about 300 g/L.

The following examples are intended to illustrate, but not to limit, the scope of the invention. It is to be understood that other procedures known to those skilled in the art may alternatively be used.

Example 1

Synergy Between a Manganese First Component and a Cerium Second Component

The catalysts with the compositions shown in Table 1 were prepared and tested for ammonia SCR reduction of nitrogen oxides. The weight percentages of manganese and cerium are given on the basis of both the oxide and the metal, where the weight percentages on the basis of the metal are in parentheses in the Table.

TABLE I

| | Compositions of Mn and Ce Catalysts | | | |
|---|---|---|---|---|
| Catalyst No. | Wt % $Mn_2O_3$ (Mn) | Wt % $CeO_2$ (Ce) | Wt % Zeolite | Wt % OSM |
| 1 | 8.8 (6.1) | 0 | 45.6 | 45.6 |
| 2 | 0 | 13.5 (11) | 43.25 | 43.25 |
| 3 | 7.7 (5.4) | 12.3 (10) | 40 | 40 |

The zeolite and OSM were placed on the substrate as a washcoat at a loading of about 150 g/L. The washcoat was dried at room temperature and then calcined at 550° C. for 4 hours. Aqueous solutions of manganese nitrate and cerium nitrate were combined and impregnated into the washcoat on the substrate. The catalysts were dried and calcined at 550° C. for 2 hours. The OSM comprised CZLY having a formula of $Ce_{0.24}Zr_{0.66}La_{0.04}Y_{0.06}O_2$, and the zeolite was comprised of ZSM-5.

The catalysts in Table 1 were tested as fresh catalysts and after hydrothermal aging in air containing approximately 10% water vapor at 750° C. for 20 hours.

The catalysts were tested for selective catalytic reduction of $NO_x$ with an inlet gas composition of 350 ppm NO, 350 ppm $NH_3$, 5% $CO_2$, 50 ppm $C_3H_6$, 14% $O_2$, 10% $H_2O$, with the balance $N_2$. The space velocity was 30,000 $hr^{-1}$. The temperature was increased from 140 to 400° C. at 20° C./min. FIG. 1 shows graphs of the percent NO conversion versus temperature in ° C. for catalysts that contained manganese but no cerium (Catalyst 1), cerium but no manganese (Catalyst 2), and both manganese and cerium (Catalyst 3). The catalysts were tested as fresh catalysts and after hydrothermal aging.

As shown in FIG. 1, the fresh Mn/Ce catalyst (Catalyst 3) had higher NO conversion activity than the fresh Mn catalyst (Catalyst 1) over at least most of the temperature range. The fresh Mn catalyst (Catalyst 1) in turn had higher NO conversion activity than the fresh Ce catalyst (Catalyst 2).

The activity of all three catalysts declined after hydrothermal aging. The activity of Catalyst 1 with Mn alone declined far more with hydrothermal aging than did the activity of the Mn/Ce catalyst (Catalyst 3), a catalyst according to embodiments of the present invention. Although the decline in activity for the Ce catalyst (Catalyst 2) on hydrothermal aging was moderate, the activity of the fresh Ce catalyst was far lower than the activity of the other two fresh catalysts. The hydrothermally aged Ce catalyst had the lowest activity of any of the catalysts in FIG. 1.

Catalyst 3, with manganese as a first component and cerium as a second component, a catalyst according to embodiments of the present invention, had significantly higher activity than Catalyst 1 with manganese as a first component and Catalyst 2 with cerium as a second component, respectively. The mixed Mn/Ce catalyst, Catalyst 3, was more stable toward hydrothermal aging than either the Mn catalyst or the Ce catalyst.

The activity of the mixed Mn/Ce catalyst, a catalyst according to an embodiment of the present invention, was higher than the activities of the single component catalysts, both when fresh and after aging. The Mn first component and the Ce second component have a synergistic effect on each other.

Example 2

Effects of NO and NO/$NO_2$ Feed Gases on Iron Beta SCR Activity

Iron-exchanged zeolite beta was supplied by Tricat GmbH, Bitterfeld, Germany. Catalyst 4, with the composition shown in Table 2, was prepared with the iron-exchanged Beta zeolite.

TABLE 2

Composition of Iron-Exchanged Beta Catalyst

| Catalyst No. | Wt % Iron-exchanged zeolite beta | Wt % OSM |
|---|---|---|
| 4 | 50 | 50 |

Figure 2:
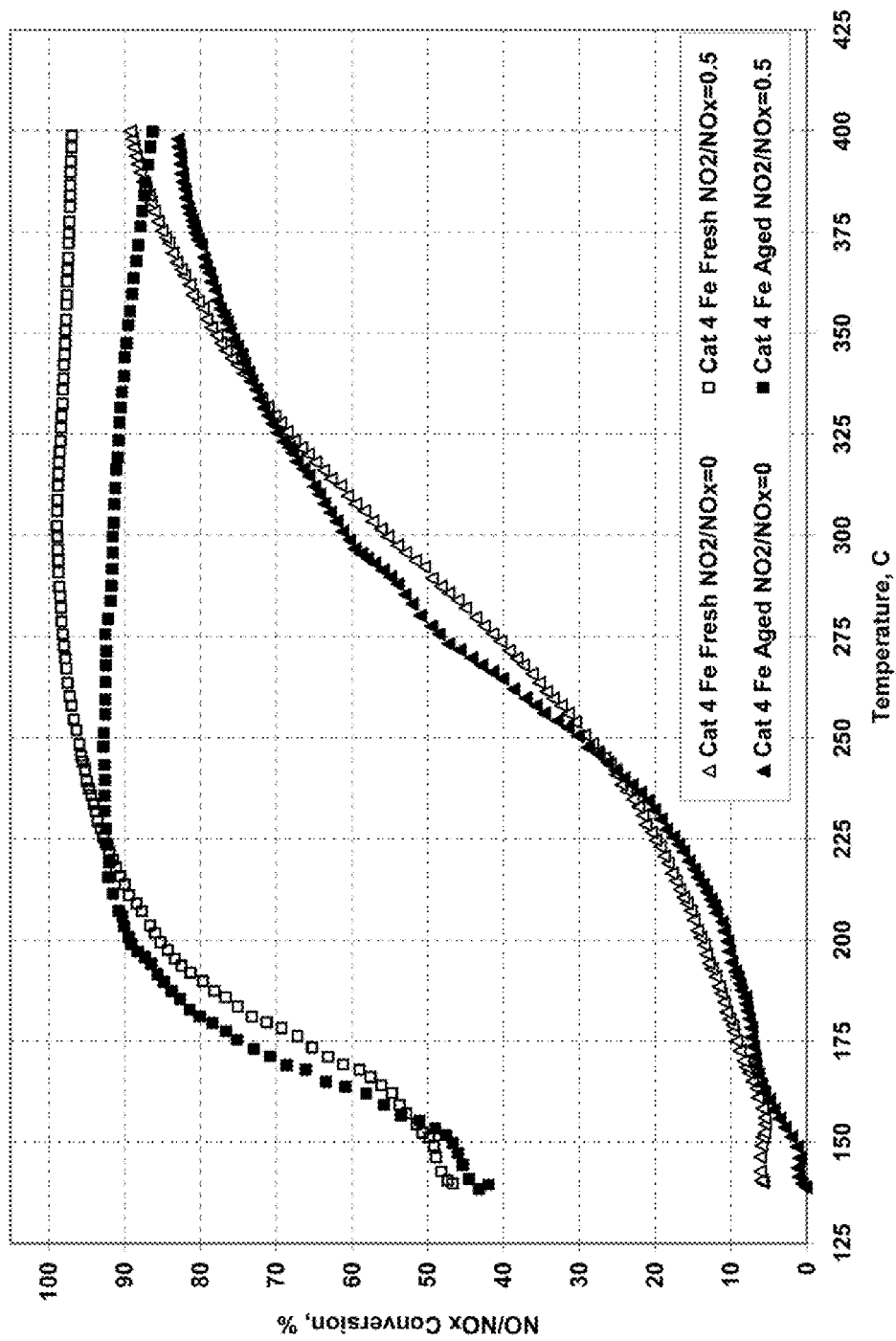
FIG. 2—is a plot showing the percent NO or $NO_x$ conversion versus temperature in degrees Centigrade for a fresh and a hydrothermally aged iron-exchanged zeolite beta catalyst with a first feed gas that contains NO and with a second feed gas that contains both NO and $NO_2$.

Catalyst 4 was tested as a fresh catalyst and after hydrothermal aging with two different feed gases. The first feed gas contained 350 ppm NO with no $NO_2$. The second feed gas contained a mixture of 175 ppm NO and 175 ppm $NO_2$. Plots of NO/$NO_x$ conversion versus temperature for both feed gases are shown in FIG. 2.

Hydrothermal aging had little effect on the activity of Catalyst 4 with either the mixed NO/$NO_2$ feed gas or the feed gas that contained only NO.

The activities of both the fresh and the hydrothermally aged Catalyst 4 with the feed gas that contained NO but no $NO_2$ were far lower than the catalyst activities with the mixed NO/$NO_2$ feed gas. The NO conversions with the NO feed gas at 200° C. for the fresh and hydrothermally aged Catalyst 4 were only about 14% and 11%, respectively, compared to about 84% and about 89% for the fresh and aged catalyst with the mixed NO/$NO_2$ feed gas. The iron/zeolite-Catalyst 4 was not effective at $NO_x$ conversion when the feed gas contained NO with no $NO_2$. Diesel exhaust normally has a high NO/$NO_2$ ratio. The iron/zeolite catalyst may therefore be expected to have low activity for SCR $NO_x$ conversion in diesel service.

Example 3

Effects of NO and NO/$NO_2$ Feed Gases on Mn/Ce/Zeolite/OSM Catalyst Activity

Figure 3:
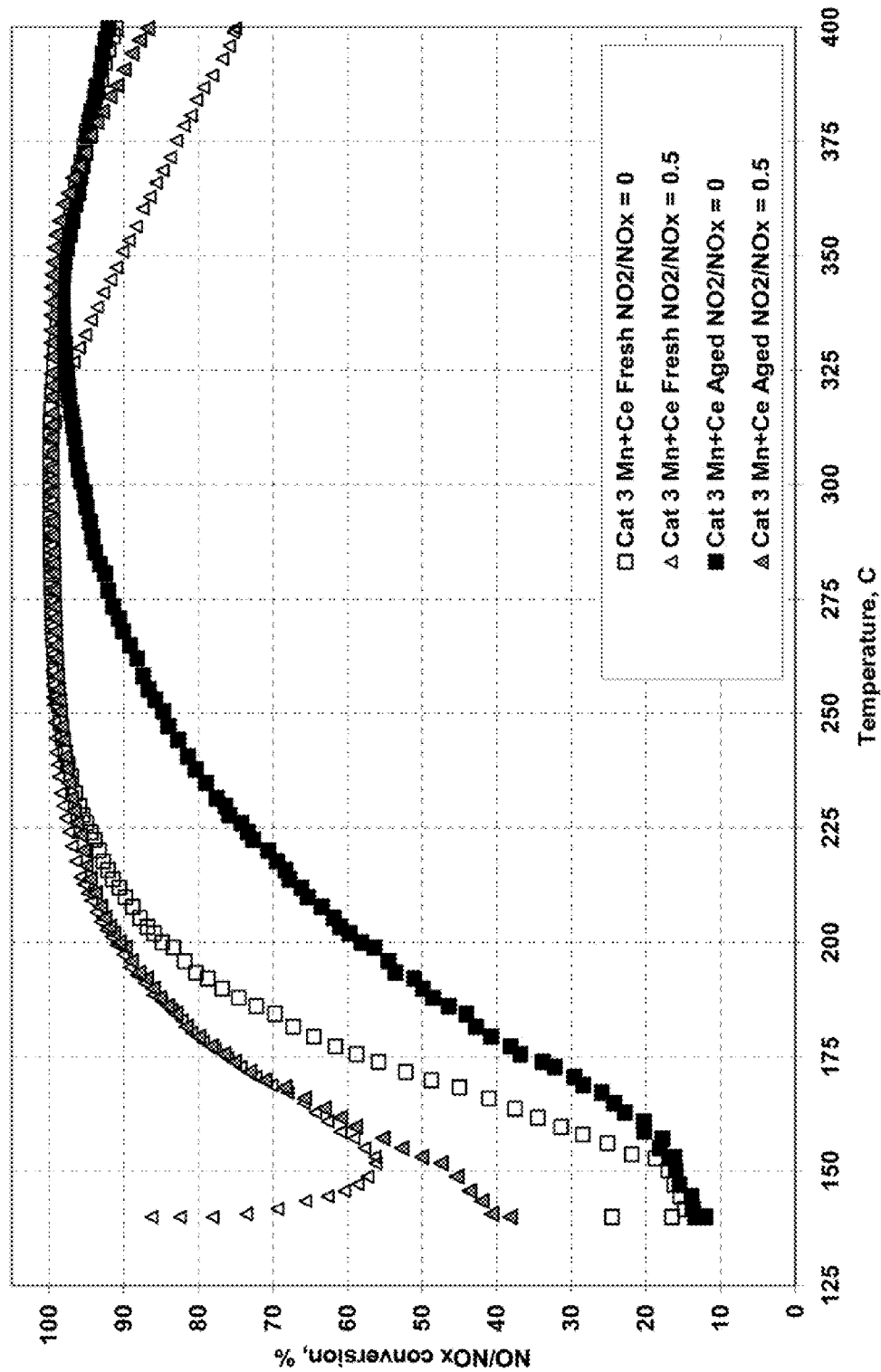
FIG. 3—is a plot showing the percent NO or $NO_x$ conversion versus temperature in degrees Centigrade for fresh and hydrothermally aged catalysts having manganese as first component and cerium as a second component with a first feed gas that contains NO and with a second feed gas that contains both NO and $NO_2$.

Catalyst 3, the Mn/Ce/zeolite/OSM catalyst, a catalyst according to an embodiment of the present invention, was tested for SCR activity in Example 3 with NO and NO/$NO_2$ feed streams in the same manner as was the Fe/Zeolite beta catalyst, Catalyst 4, in Example 2. The catalyst was tested as a fresh catalyst and after hydrothermal aging. The results are shown graphically in FIG. 3.

The $NO_x$ conversion activities for the fresh and hydrothermally aged Catalyst 3 with the mixed NO/$NO_2$ feed gas were essentially the same.

The NO conversions of the fresh and hydrothermally aged Mn/Ce catalyst with the feed stream that contained NO but no $NO_2$ were lower than the corresponding activities with the mixed NO/$NO_2$ feed stream. However, the conversion differences between the mixed NO/$NO_2$ feed stream and the pure NO feed stream for the Mn/Ce/zeolite/OSM catalyst, Catalyst 3, were not nearly as great as for the Fe/Zeolite-beta catalyst, Catalyst 4 of Example 2. The activity comparison between the Catalyst 3 and Catalyst 4 with the feed gas that contained NO but no $NO_2$ is shown in more detail in Example 4.

Example 4

Figure 4:
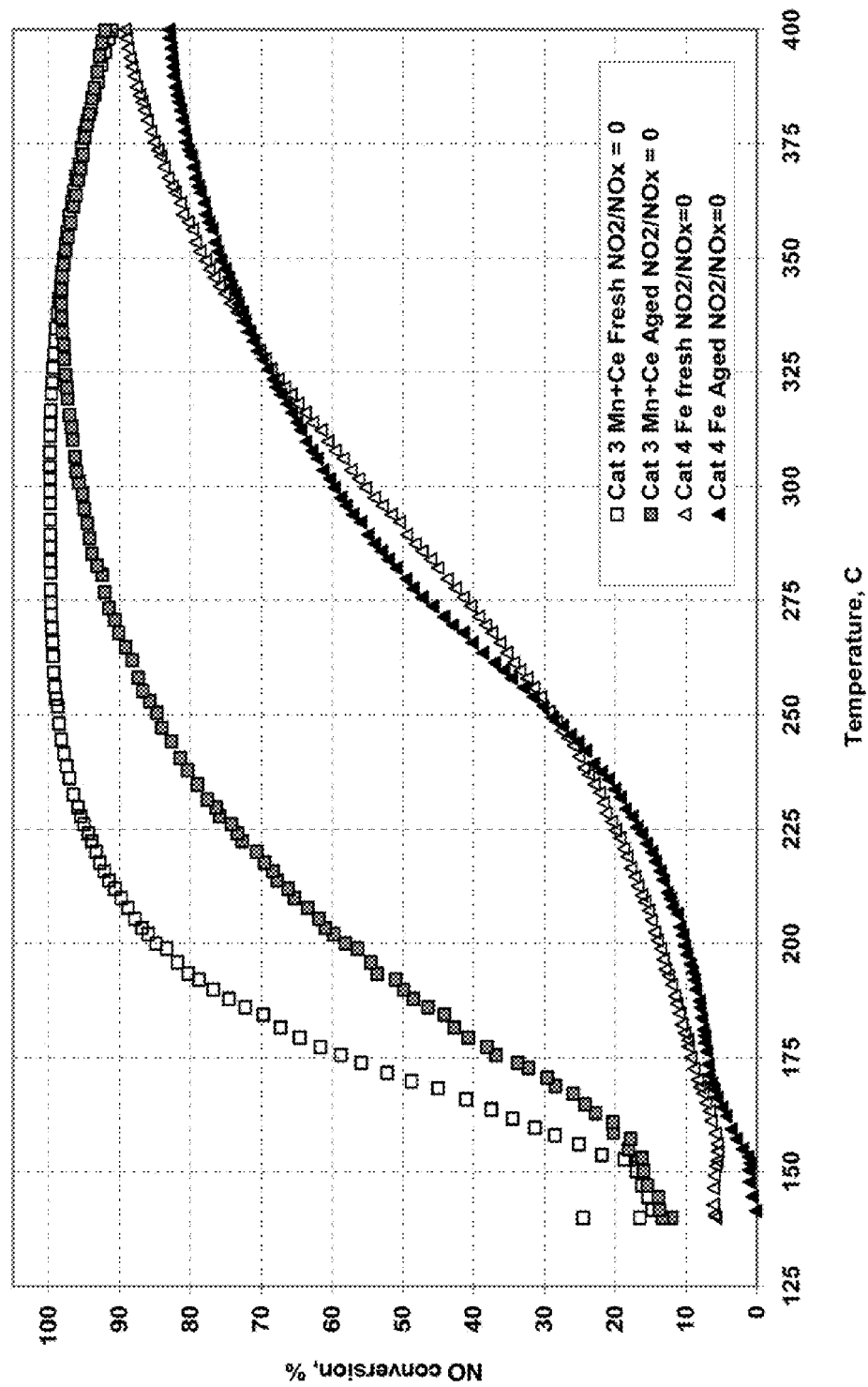
FIG. 4—is a plot showing the percent NO conversion versus temperature in degrees Centigrade for a manganese-cerium catalyst and the percent conversion for an iron-exchanged zeolite beta catalyst FIG. 5—is a plot comparing the percent NO conversion versus temperature in degrees Centigrade for a variety of catalysts with and without an additional strontium second component, where the catalysts were hydrothermally aged before testing.

Comparison of Mn/Ce/Zeolite/OSM Catalyst with Fe/Zeolite Beta/OSM Catalyst with NO Feed Gas FIG. 4 shows a graphical comparison of the NO conversion activity of Catalyst 3, the Mn/Ce/zeolite/OSM catalyst, with that of Catalyst 4, the Fe/Zeolite beta/OSM catalyst, with a feed stream that contained NO but no $NO_2$. The graphs show the results for both fresh and hydrothermally-aged catalysts.

The Mn/Ce/zeolite/OSM catalyst, a catalyst according to embodiments of the present invention, was far more active for NO conversion with the NO feed gas than was the Fe/Zeolite beta catalyst over the entire temperature range shown in FIG. 4, both for the fresh catalyst and the hydrothermally-aged catalyst.

The NO conversions for fresh and hydrothermally aged Mn/Ce/zeolite/OSM, Catalyst 3, at a temperature of 200° C. were approximately 84% and approximately 58%, respectively, compared to approximately 14% and approximately 11% for the fresh and hydrothermally aged Fe/Zeolite beta/OSM catalyst, Catalyst 4, at the same temperature. The NO conversion activity for the iron catalyst at 200° C. with the feed stream that contained NO but not $NO_2$ was very low.

Catalyst 3, a catalyst according to embodiments of the present invention, was effective at converting NO at the low temperatures and the high $NO/NO_2$ ratios that are encountered in diesel applications. The iron/zeolite catalyst, Catalyst 4, was not effective in converting NO under these conditions.

Example 5

Figure 5:
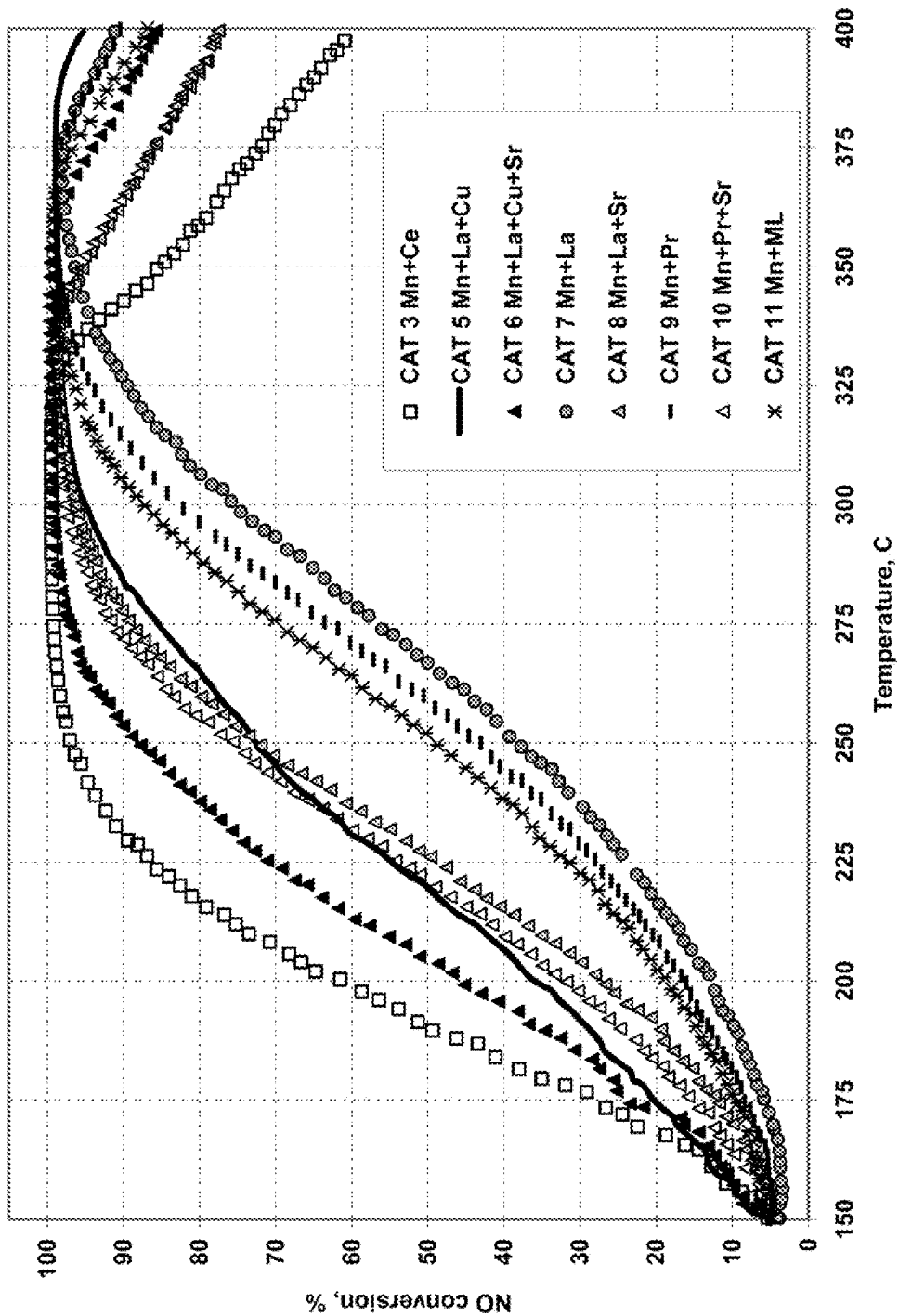

Preparation and Testing of Catalysts With and Without an Optional Strontium Second Component A series of catalysts with and without an optional strontium second component were synthesized and tested. The compositions of the catalysts are shown in Table 5 below. Plots of the percent NO conversions versus temperature after hydrothermal aging for the catalysts of Table 3 are shown in FIG. 5.

All of the catalysts contained approximately 40 wt % OSM CZLY such as the one described in example 1, and approximately 40 wt % zeolite comprised of ZSM-5, in addition to the other components. The components listed in Table 3 make up the about 20% remainder of the catalysts. The catalysts contained approximately 7 wt % of the first component or components, approximately 13 wt % of the second component or components, and approximately 8 wt % of the strontium second component, if present, partially replacing the initial second component. All of the weight percentages are on the basis of the metal oxides. ML in Table 3 stands for a mixture of lanthanides from a mixed lanthanide nitrate solution, commercially available from Molycorp (Greenwood Village, Colo., USA).

TABLE 3

Compositions of Catalysts With and Without Strontium Component

| Cat. No. | First Component(s) | Second Component(s) | Strontium Component? |
|---|---|---|---|
| 3 | Manganese | Cerium | No |
| 5 | Manganese, Copper | Lanthanum | No |
| 6 | Manganese, Copper | Lanthanum | Yes |
| 7 | Manganese | Lanthanum | No |
| 8 | Manganese | Lanthanum | Yes |
| 9 | Manganese | Praseodymium | No |
| 10 | Manganese | Praseodymium | Yes |
| 11 | Manganese | ML | No |

FIG. 5 shows plots of the NO conversions versus temperature in degrees Centigrade for the catalysts of Table 3. The catalysts were tested under the same conditions as for Example 1.

Catalysts 6, 8, and 10 comprised strontium as an additional second component. Catalysts 5, 7, and 9 respectively were the corresponding catalysts that did not comprise strontium as an additional second component. As shown in FIG. 5, the catalysts with strontium as an additional second component had higher NO conversion activity than the catalysts that did not comprise strontium as an additional second component over at least most of the temperature range. Catalysts that comprise strontium as an additional second component have higher NO conversion activities than the corresponding catalysts that did not comprise strontium as an additional second component.

Example 6

Preparation and Testing of Catalysts with Various First Components and Second Components A series of catalyst with the compositions shown in Table 4 are prepared and are tested for ammonia SCR activity. All of the catalysts comprise zeolite and OSM and the components listed in Table 4 in about the same proportions as the examples in Table 3. A typical ML (without limitation) would have the composition: 7.5 wt % $PrO_x$ (where X is between about 1.5 to about 2); 63 wt % $LaO_{1.5}$; 7.5 wt % $CeO_2$ and 22 wt % $NdO_{1.5}$.

TABLE 4

Compositions of Catalysts

| Catalyst No. | First Component | Second Component |
|---|---|---|
| 13 | Copper | None |
| 1 | Manganese | None |
| 14 | Iron | None |
| 15 | Niobium | None |
| 16 | Mixture of Cu, Mn, Fe, Nb | None |
| 2 | None | Cerium |
| 17 | None | Lanthanum |
| 18 | None | ML |
| 19 | None | ML and Cerium |
| 20 | Copper | Cerium |
| 21 | Copper | Lanthanum |
| 22 | Copper | ML |
| 23 | Copper | ML and Cerium |
| 3 | Manganese | Cerium |
| 7 | Manganese | Lanthanum |
| 11 | Manganese | ML |
| 12 | Manganese | Neodymium |
| 24 | Manganese | ML and Cerium |
| 25 | Iron | Cerium |
| 26 | Iron | Lanthanum |
| 27 | Iron | ML |
| 28 | Iron | ML and Cerium |
| 29 | Niobium | Cerium |
| 30 | Niobium | Lanthanum |
| 31 | Niobium | ML |
| 32 | Niobium | ML and Cerium |
| 33 | Mixture of Cu, Mn, Fe, Nb | Cerium |
| 34 | Mixture of Cu, Mn, Fe, Nb | Lanthanum |
| 35 | Mixture of Cu, Mn, Fe, Nb | ML |
| 36 | Mixture of Cu, Mn, Fe, Nb | ML and Cerium |
| 37 | Mixture of Cu, Mn | ML and Strontium |
| 38 | Mixture of Cu, Mn, Fe, Nb | ML and Strontium |
| 39 | Mixture of Cu, Mn | ML, Cerium and Strontium |
| 40 | Mixture of Cu, Mn, Fe, Nb | ML, Cerium and Strontium |
| 6 | Mixture of Cu, Mn | ML and Strontium |
| 41 | Mixture of Cu, Mn, Fe, Nb | ML and Strontium |
| 42 | Manganese | Neodymium and Strontium |

The catalysts are tested. The catalysts having a first component with no second component or a second component with no first component are predicted to have lower activity at low temperatures and lower hydrothermal stability than the corresponding catalysts having both a first component and a second component. Low temperature activity is important for diesel applications, because diesel exhaust is normally at low temperature. Hydrothermal stability is also important for diesel applications, because diesel exhaust contains water vapor.

Example 7

Effects of Hydrothermal Aging on SCR Activity of Mn—Ce-Zeolite and $V_2O_5$—$TiO_2$ SCR Catalysts Commercial $V_2O_5$—$TiO_2$ SCR catalyst was supplied by Ceram (CERAM Catalysts GmbH; Frauenthal, Austria). Catalyst 3 and the commercial $V_2O_5$—$TiO_2$ SCR catalyst were tested as a fresh catalyst and after hydrothermal aging (about 10% water vapor in air) at 750° C. for 20 hrs. Catalyst 3 was coated on flow-through honeycomb cordierite substrate (all channels are opened). The commercial V—Ti catalyst was an extruded honeycomb catalyst, where the entire honeycomb was made of the V—Ti catalyst. A core sample 1" dia and 1.5" long was cut from each substrate and tested at both fresh and aged conditions.

Figure 6:
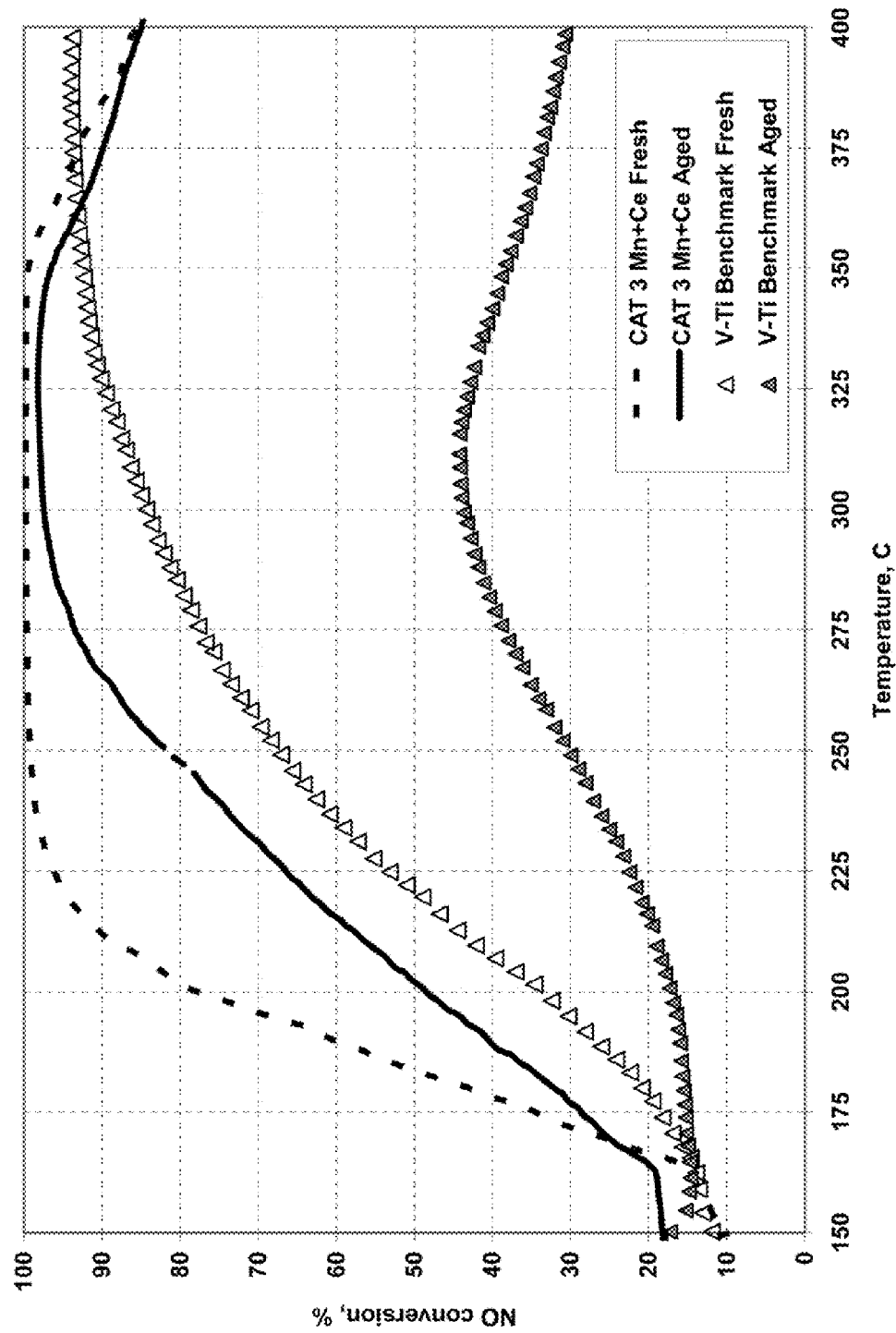
FIG. 6—Comparison of NO conversion by catalyst 3 and V—Ti catalyst at both fresh and hydrothermally aged at 750° C. for 20 hrs.

The catalysts were tested for selective catalytic reduction of $NO_x$ with an inlet gas composition of 350 ppm NO, 350 ppm $NH_3$, 5% $CO_2$, 50 ppm $C_3H_6$, 14% $O_2$, 10% $H_2O$, with the balance $N_2$. The space velocity was 60,000 $hr^{-1}$. The temperature was increased from 140 to 400° C. at 20° C./min. FIG. 6 shows graphs of the percent NO conversion versus temperature in ° C. for catalyst that contained manganese and cerium (Catalyst 3) and commercial $V_2O_5$—$TiO_2$.

The SCR activities of both the fresh and the hydrothermally aged commercial $V_2O_5$—$TiO_2$ were lower than the catalyst 3 activities. The NO conversions at 200° C. for the fresh and hydrothermally aged commercial $V_2O_5$—$TiO_2$ were only about 33% and 18%, respectively, compared to about 80% and about 48% for the fresh and aged Catalyst 3. Commercial $V_2O_5$—$TiO_2$ lost most of its activity after hydrothermal aging. Catalyst 3 is much more hydrothermally stable than commercial $V_2O_5$—$TiO_2$ Example 8

Figure 7:
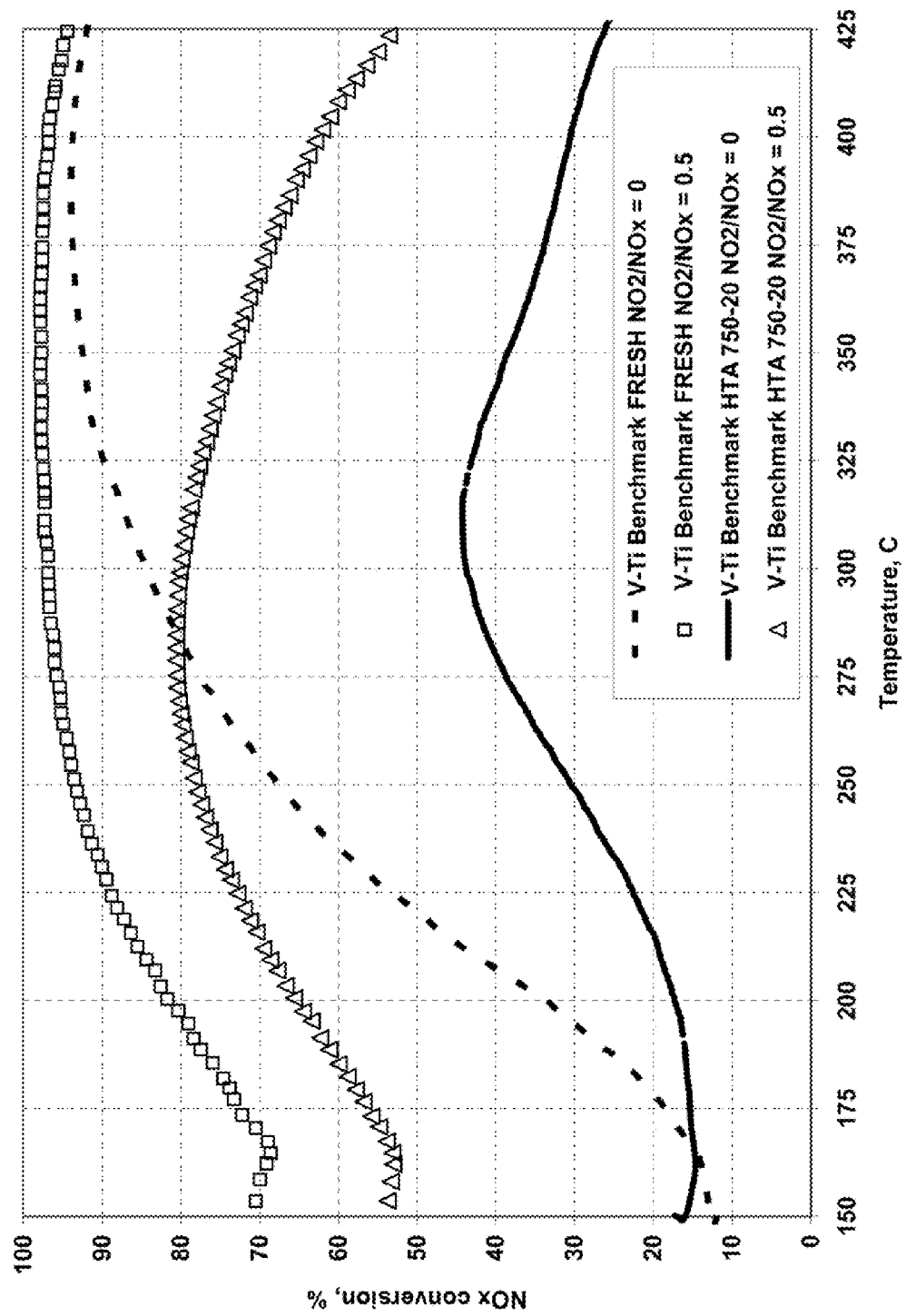
FIG. 7—Comparison of effects of NO and $NO/NO_2$ feed gases on commercial $V_2O_5$—$TiO_2$ SCR catalyst activity.

Effects of NO and NO/$NO_2$ Feed Gases on Commercial $V_2O_5$—$TiO_2$ SCR Catalyst Activity Commercial $V_2O_5$—$TiO_2$ SCR catalyst was supplied by Ceram (CERAM Catalysts GmbH; Frauenthal, Austria), and was tested as a fresh catalyst and after hydrothermal aging with two different feed gases. The first feed gas contained 350 ppm NO with no $NO_2$. In this instance, $NO_2/NO_x$=O, where $NO_x$=$NO_2$+NO. The second feed gas contained a mixture of 175 ppm NO and 175 ppm $NO_2$. SV=60K 1/hr. In this instance, $NO_2/NO_x$=0.5, where $NO_x$=$NO_2$+NO. Plots of NO and $NO_x$ conversion versus temperature for both feed gases are shown in FIG. 7.

The activities of both the fresh and the hydrothermally aged V—Ti benchmark with the feed gas that contained NO but no $NO_2$ were far lower than the catalyst activities with the mixed NO/$NO_2$ feed gas. The NO conversions with the NO feed gas at 200° C. for the fresh and hydrothermally aged V—Ti samples were only about 32% and 16%, respectively, compared to about 82% and about 65% for the fresh and aged catalyst with the mixture of NO and $NO_2$ feed gas. V—Ti benchmark catalyst was not very effective at temperatures below 250° C. for $NO_x$ conversion when the feed gas contained NO with no $NO_2$. After hydrothermal aging V—Ti benchmark did not show more than 80% $NO_x$ conversion at any temperature even with feed gas containing so called "fast $NO_x$"—equimolar mixture of NO and $NO_2$ in the feed gas ($NO_2/NO_x$=0.5).

Example 9

Figure 8:
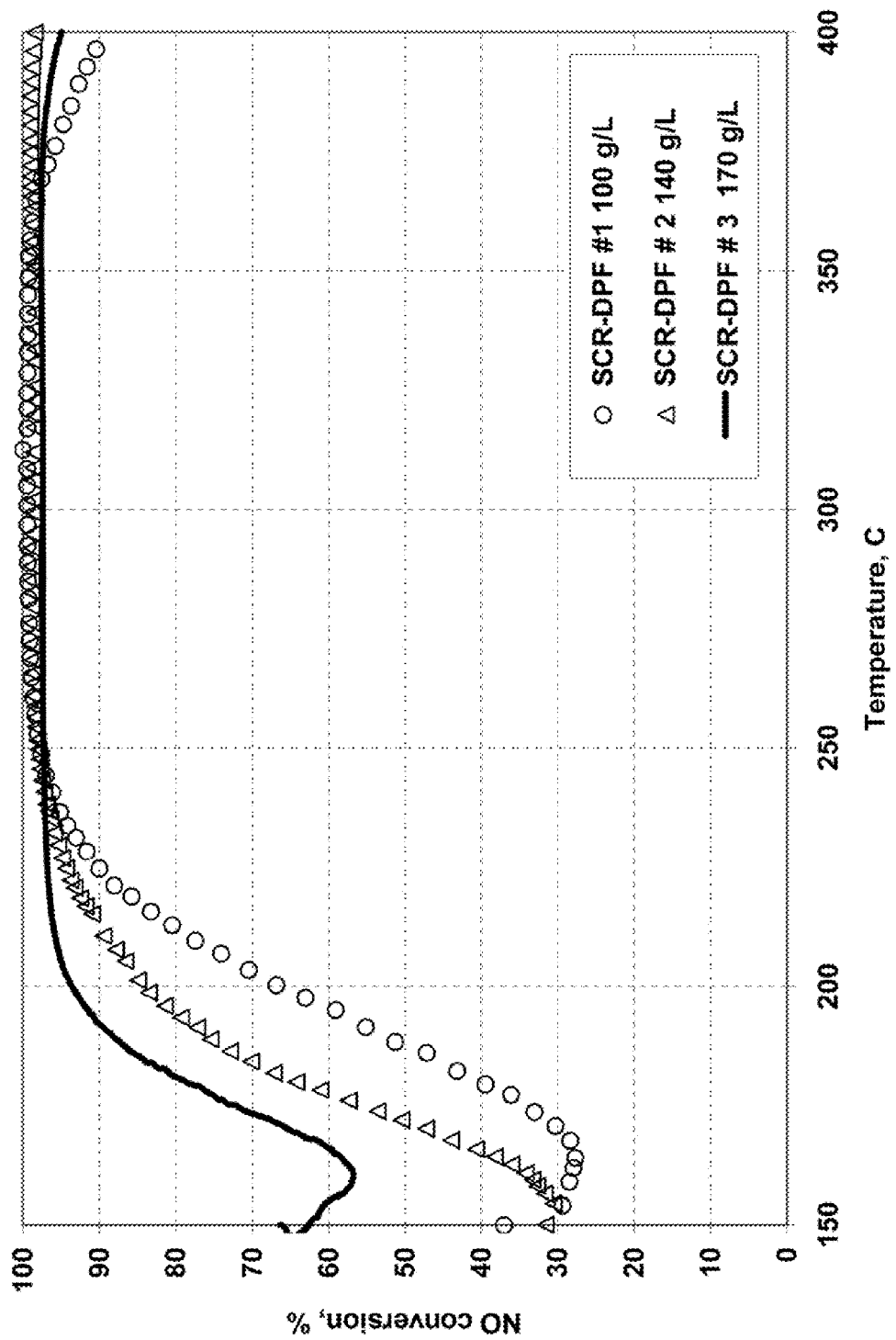
FIG. 8—Comparison of SCR-DPF activity with various wash-coat loadings.

Preparation and Testing of Mn/Ce/Zeolite/OSM Catalysts with Various Amounts of Wash-Coat Loading on DPF Substrates The Zeolite and OSM (CZLY) catalyst 3 described in example 1 were placed as a washcoat on samples of wall-flow filter substrates (1" diameter and 3" long) at 3 different loadings: SCR-DPF 1 had 100 g/L, SCR-DPF 2-140 g/L and SCR-DPF 3-170 g/L. Samples of substrates were provided by NGK (Nagoya, Japan) and had 300 cells per square inch (cpsi) and 65% porosity of filter walls. The substrates were designed to be representations of real diesel particulate filters. The lab samples had the channels alternately plugged at an inlet and an outlet so that the exhaust gas would be forced to flow through the porous walls of the filter while traveling from the inlet to the outlet of the wall flow filter. The washcoat was dried at room temperature and then calcined at 550° C. for 4 hours. Aqueous solutions of manganese nitrate and cerium nitrate were combined and impregnated into the washcoat on the substrate. The catalysts were dried and calcined at 550° C. for 2 hours The catalysts were tested for selective catalytic reduction of $NO_x$ with an inlet gas composition of 350 ppm NO, 350 ppm $NH_3$, 5% $CO_2$, 50 ppm $C_3H_6$, 14% $O_2$, 10% $H_2O$, with the balance $N_2$. The space velocity was 30,000 $hr^{-1}$. The temperature was increased from 140 to 400° C. at 20° C./min. FIG. 8 shows graphs of the percent NO conversion versus temperature in ° C. for catalysts that contained manganese and cerium with different wash-coat loadings. Catalysts with higher wash-coat loading showed better NO conversion than catalysts with lower wash-coat loadings at low temperatures (below 240° C.).

Figure 9:
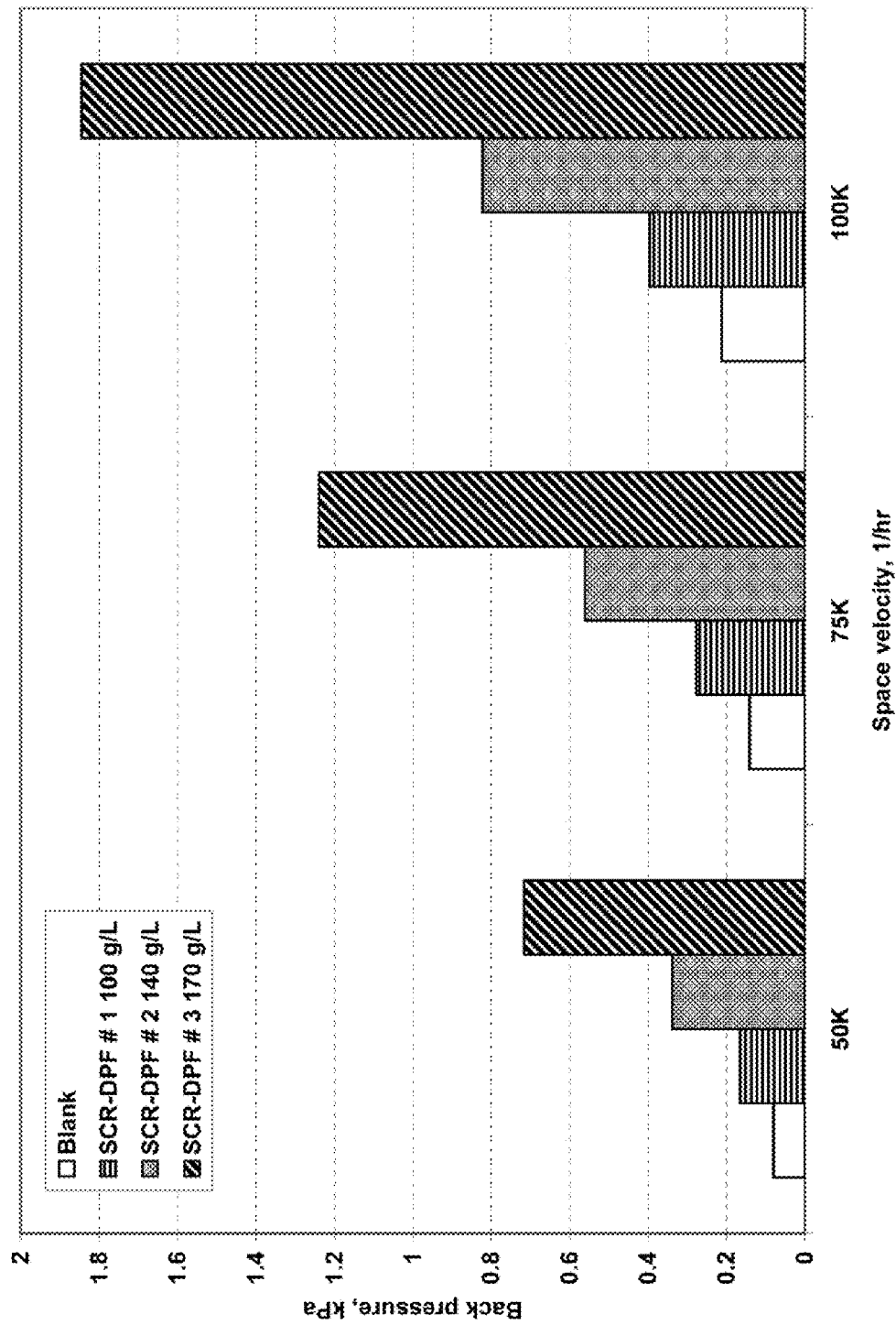
FIG. 9—Comparison of back pressure measurement for SCR-DPF samples with various wash-coat loadings.

FIG. 9 shows back pressure measurement for the same SCR-DPF samples with various wash-coat loadings OF 100, 140 and 170 g/L. Back pressure measurements were done on a cold flow bench at three different flow rates which correspond to 50000 $hr^{-1}$, 75000 $hr^{-1}$ and 100000 $hr^{-1}$. Tests results show that higher wash-coat loading lead to increase in back pressure of the sample. Back pressure should be kept as low as possible in diesel after-treatment systems, so washcoat loading for SCR-DPF has to be considered for each application. Acceptable DPF substrates of the embodiments of the present disclosure include substrates with high porosity walls which would allow applying more wash-coat while maintaining acceptable back pressure.

Example 10

Analyzing Soot Oxidation Activity of SCR-DPF Using TG/DTA

Figure 10A:
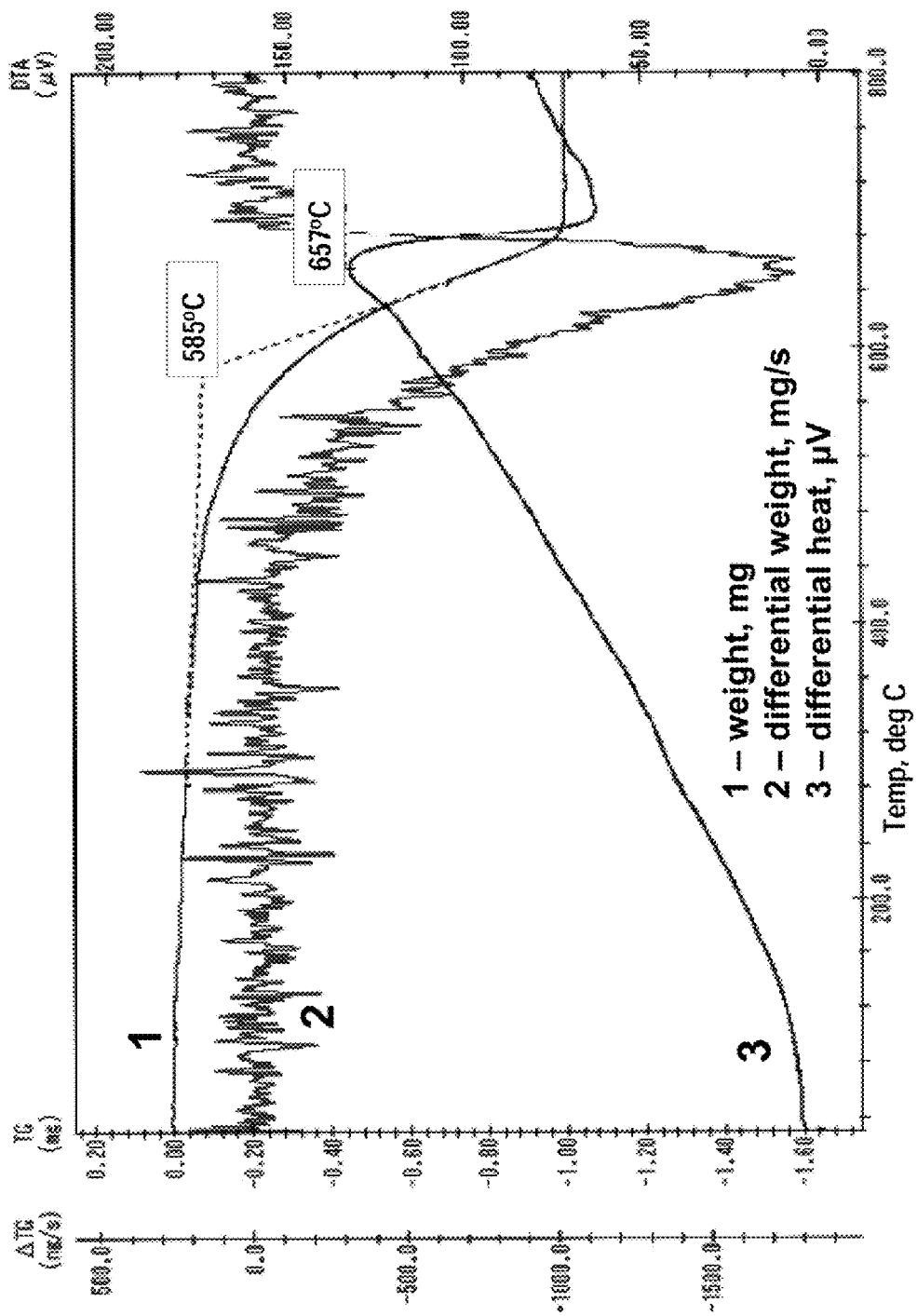
FIG. 10a—TG/DTA results on soot oxidation of a DPF without catalyst with 400 ppm $NO_2$ in the reaction gas.

TG/DTA (Thermogravimetric/Differential Thermal Analysis) was used to determine soot oxidation properties of Mn/Ce/Zeolite SCR catalyst, catalyst 3 described in Example 1, used for SCR-DPF coating. First, however, FIG. 10A shows results of TG/DTA on soot oxidation without catalyst. Powdered soot was heated without the presence of any catalyst. Inlet gas composition: 400 ppm $NO_2$; 10% $O_2$, balance $N_2$. Analysis indicates that soot oxidation without catalyst started at about 585° C. and peaked at about 657° C.

Figure 10B:
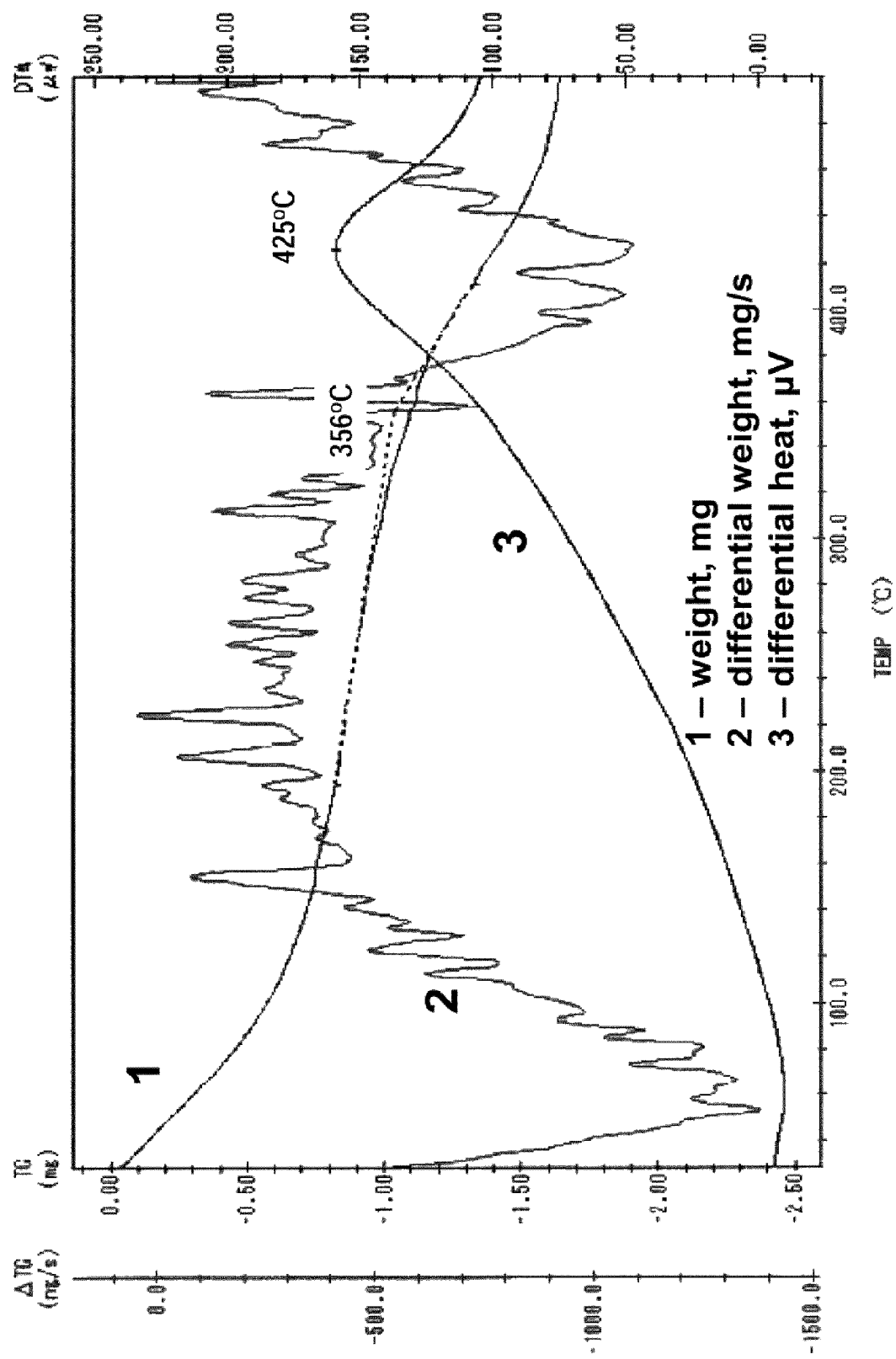
FIG. 10b—TG/DTA results on soot oxidation of a DPF with catalyst with 400 ppm $NO_2$ in the reaction gas.

FIG. 10B shows TG/DTA results for soot oxidation with SCR catalyst in presence of $NO_2$ in the reaction gas. Powdered soot and catalyst were mixed at 5/95 weight ratio. Inlet gas composition: 400 ppm $NO_2$; 10% $O_2$, balance $N_2$. Analysis shows that when it was mixed with Mn/Ce/Zeolite SCR catalyst (Catalyst 3 described in example 1) soot started oxidizing in presence of $NO_2$ at about 356° C.; maximum oxidation rate was observed at about 425° C. Surprisingly and unexpectedly, the catalyst of the present disclosure reduced the soot oxidation temperature by over 200° C.

Figure 10C:
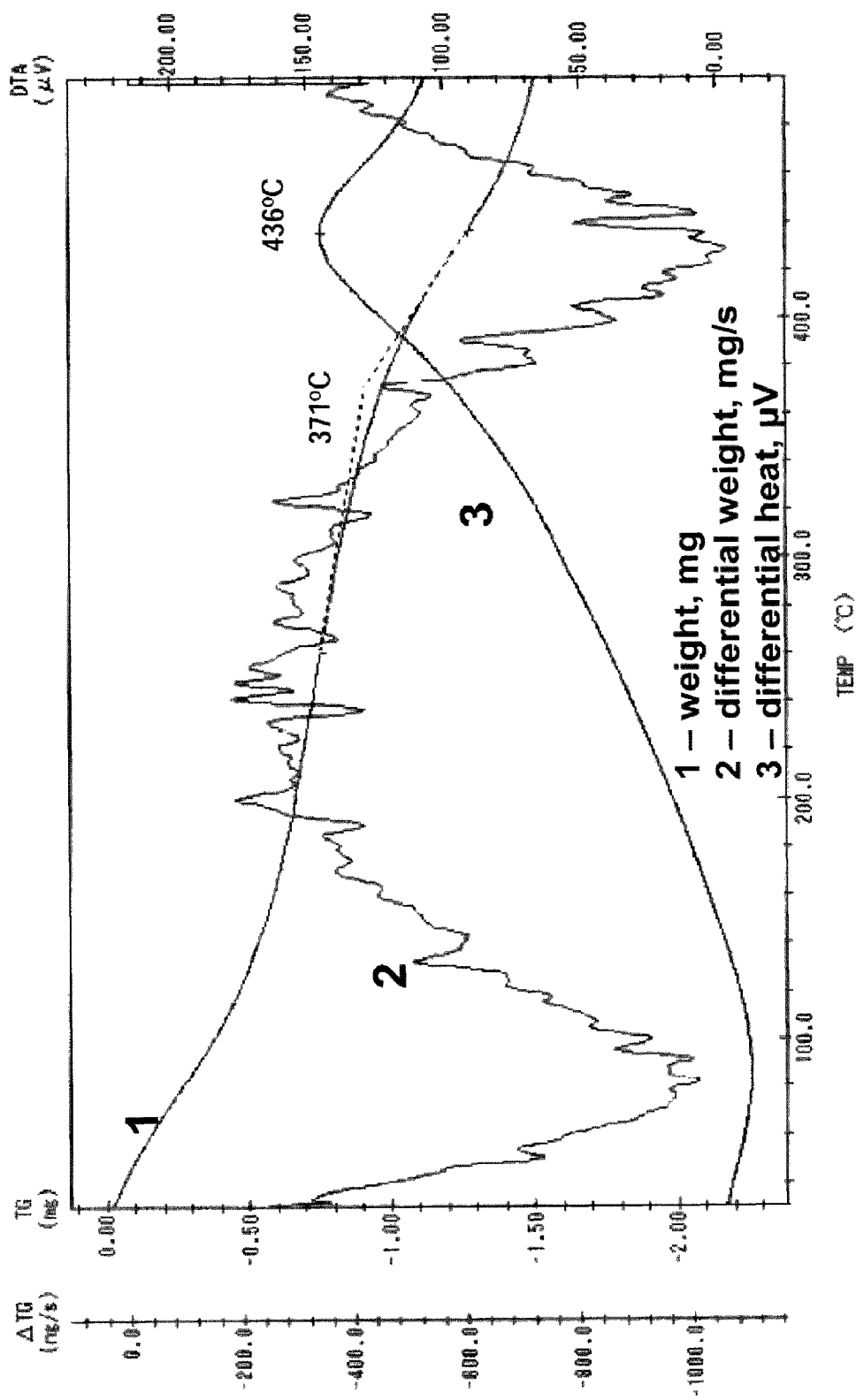
FIG. 10c—TG/DTA results on soot oxidation of a DPF with catalyst without $NO_2$ in the reaction gas.

FIG. 10C shows TG/DTA results for soot oxidation with SCR catalyst without $NO_2$ in the reaction gas. Soot and catalyst is mixed at 5/95 weight ratio. Inlet gas composition: 0 ppm $NO_2$; 10% $O_2$, balance $N_2$. Analysis shows that when it was mixed with SCR catalyst soot started oxidizing in absence of $NO_2$ at about 371° C.; maximum oxidation rate was observed at about 436° C. These results indicate that Mn/Ce/Zeolite SCR catalyst is capable of soot oxidation at temperatures below 400° C. without nitrogen dioxide via oxygen oxidation mechanism. Surprisingly and unexpectedly, the catalyst of the present disclosure reduced the soot oxidation temperature by over 200° C. even in the absence of $NO_2$.

Example 11

Engine Tests of Mn/Ce/Zeolite/OSM Catalyst Coated on DPF for Soot Oxidation Activity Soot oxidation activity of Mn/Ce/Zeolite catalyst (catalyst 3 described in example 1) via $NO_2$ as well as $O_2$ mechanism was confirmed in this example on an engine test bench. Ce/Mn/Zeolite catalyst had been applied on 9"×12" (12.5 liters) 65% porosity cordierite DPF (purchased from NGK, Nagoya, Japan) at 100 g/L wash-coat level. The balance point temperature (BPT) tests were carried out on engine bench equipped with Cummins ISB 5.9 L diesel engine.

Figure 11:
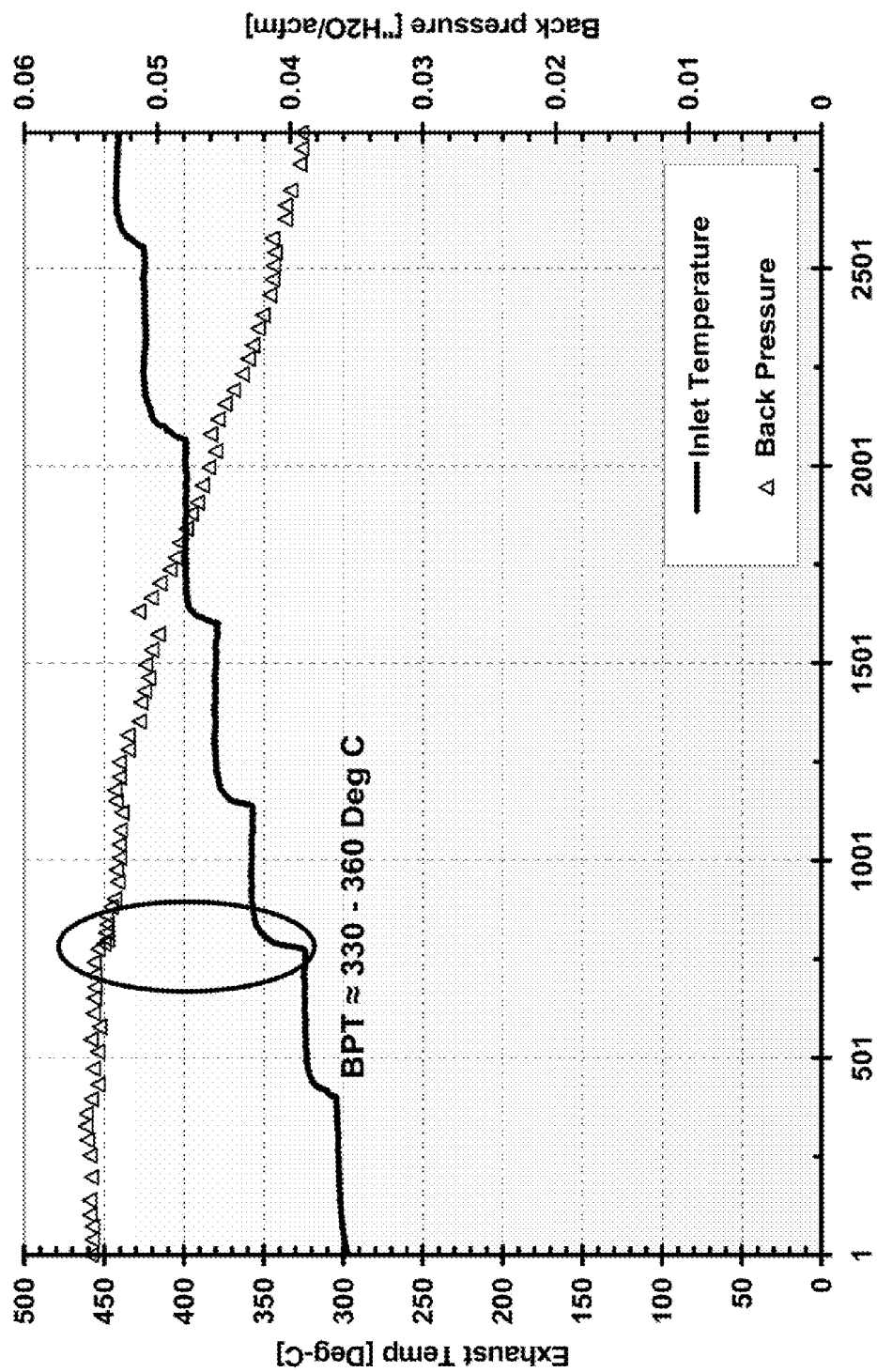
FIG. 11a—Balance Point Temperature for SCR-DPF with low $NO_2$ exhaust.
FIG. 11b—Balance Point Temperature for SCR-DPF with high $NO_2$ exhaust—DOC upstream.

FIG. 11A shows results of the Balance Point Temperature (BPT) test for after-treatment system consisting of SCR-DPF only. No Diesel Oxidation Catalyst (DOC) had been installed upstream of the coated filter, corresponding to a low concentration of $NO_2$ in the exhaust gas—typically 5% of total $NO_x$ or less. The SCR-DPF was loaded with 3.5 g/L soot prior to conducting the BPT test. In addition to the soot loaded onto the SCR-DPF, additional soot accumulated on the SCR-DPF as the diesel engine operated. Results of the test indicate that back pressure of the soot-loaded filter started going down when exhaust temperature was raised from 330 to 360° C., which means that amount of soot began to be reduced as soot was getting oxidized. This means that the BPT for the Mn/Ce/Zeolite SCR catalyst (catalyst 3 as described in example 1) coated on the SCR-DPF with engine out $NO_2$ is about 330-360° C. The rate of reduction increased with subsequent temperature increases. This test confirmed TG/DTA results that soot oxidation might occur at temperatures below 400° C. even in absence of $NO_2$. Further, the test suggests that the SCR-DPF can oxidize both existing and accumulating soot such that existing soot can be oxidized and soot will be further prevented from accumulating.

Figure 11B:
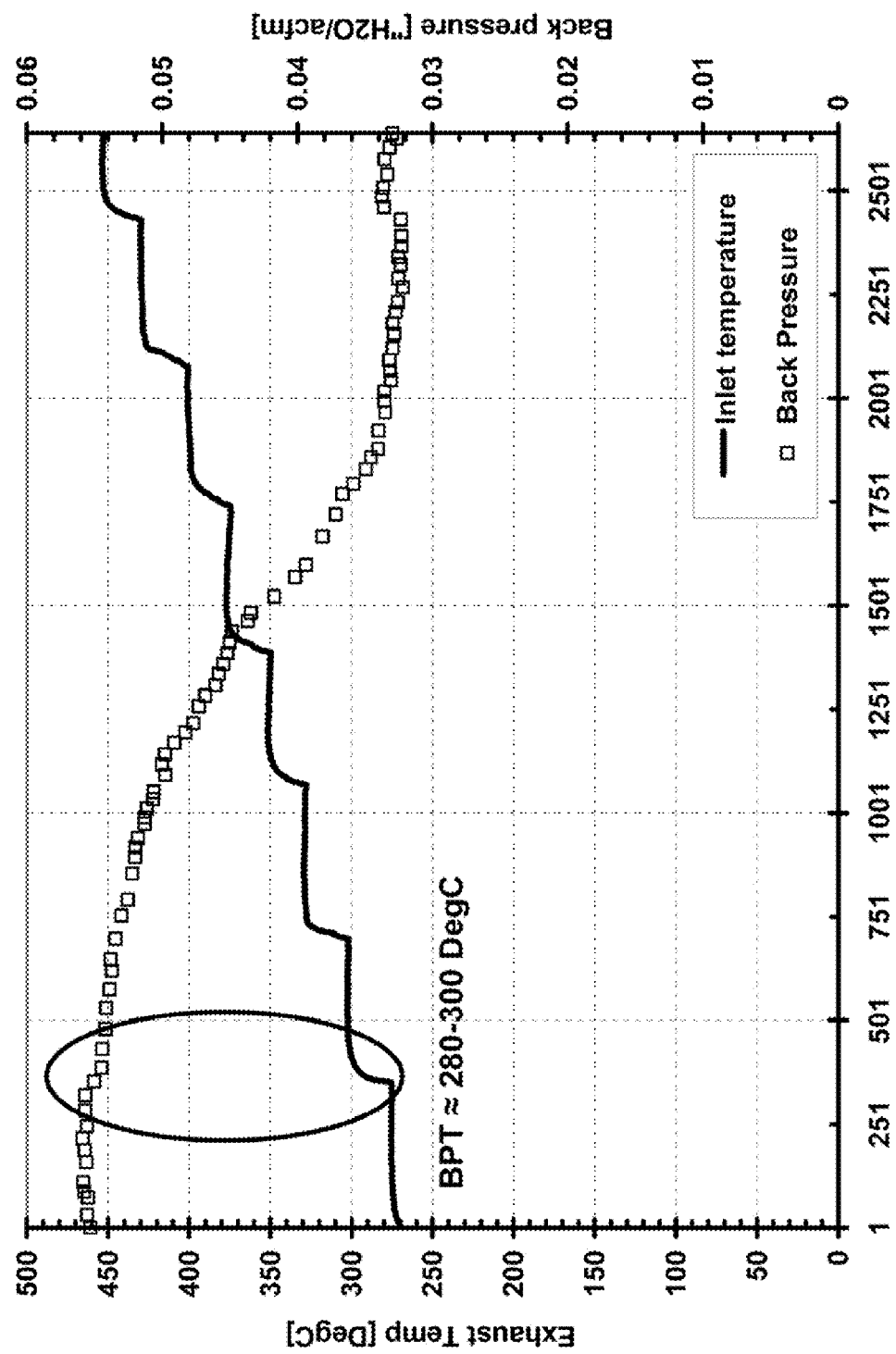

FIG. 11B shows results of the balance point temperature (BPT) test for after-treatment system consisting of combination of DOC and SCR-DPF. A diesel oxidation catalyst (9"× 6"-6.25 L) had been installed upstream of the SCR-DPF coated with Mn/Ce/Zeolite SCR (catalyst 3 described in Example 1). The DOC partially oxidized nitrogen oxide in the engine exhaust increasing the amount of nitrogen dioxide in front of the SCR-DPF. The SCR-DPF was loaded with 3.5 g/L soot prior to conducting the BPT test, and again, the operating diesel engine added additional soot to the SCR-DPF during operation. The back pressure of the soot loaded filter started going down when exhaust temperature was raised from 280 to 300° C., which means that soot began to be oxidized. The rate of oxidation increased with subsequent temperature increases up to about 400-450° C. Results of the test indicate that BPT for the Mn/Ce/Zeolite SCR catalyst (catalyst 3 as described in example 1) coated on a DPF with the exhaust gas enriched with $NO_2$ by an upstream DOC was about 280-300° C. These engine tests confirm the surprising and unexpected results that Mn/Ce/Zeolite SCR-DPF is capable of a high degree of passive soot regeneration at temperatures below 400° C.

The catalysts according to embodiments of the present invention have higher activity for selective reduction of $NO_x$ with ammonia than the catalysts of the prior art. Further, the catalysts according to embodiments of the present invention have high $NO_x$ conversion activity at the low temperatures and the high $NO/NO_2$ ratios that are encountered in diesel exhaust. The catalysts according to embodiments of the present invention also have high hydrothermal stability, an important factor in diesel applications.

The catalysts according to embodiments of the present invention may have applications to other gas streams that contain $NO_x$, particularly to exhaust streams that may contain high $NO/NO_2$ ratios. Some examples of applications include, but are not limited to, exhaust gas from diesel engine powered vehicles, exhaust gas from gas turbines, exhaust gas from diesel generators, exhaust gas from electrical generation plants, exhaust gas from chemical plants, and other suitable applications.

The present invention may be embodied in other specific forms without departing from its essential characteristics. The described embodiment is to be considered in all respects only as illustrative and not as restrictive. The scope of the present invention is, therefore, indicated by the appended claims rather than by the foregoing description. All changes which come within the meaning and range of the equivalence of the claims are to be embraced within their scope.

We claim:

1. An apparatus for reducing NOx in an exhaust stream, comprising:
    a particulate filter; and
    a selective catalytic reduction catalyst disposed on the particulate filter, wherein the catalyst comprises:
        a first component selected from the group consisting of copper, chromium, cobalt, nickel, manganese, iron, niobium, and mixtures thereof;
        a second component selected from the group consisting of cerium, a lanthanide, a mixture of lanthanides, and mixtures thereof; and
        at least one material characterized by increased surface acidity.

2. The apparatus of claim 1, wherein the apparatus further comprises a source of ammonia upstream from the particulate filter, wherein the source of ammonia adds ammonia to the exhaust stream.

3. The apparatus of claim 2, further comprising a diesel oxidation catalyst upstream from the particulate filter and upstream from the source of ammonia.

4. The apparatus of claim 2 wherein the source of ammonia comprises urea, ammonium hydroxide, ammonium formate, ammonia gas or other suitable source and combination of any thereof.

5. The apparatus of claim 1 wherein the selective catalytic reduction catalyst further comprises an oxygen storage material.

6. The apparatus of claim 1, wherein the selective catalytic reduction catalyst comprises from about 1 to about 20 percent of the first component calculated on the basis of the metal, from about 2 to about 35 percent of the second component calculated on the basis of the metal, and from about 10 to about 90 percent of the material characterized by increased surface acidity.

7. The apparatus of claim 6, wherein the selective catalytic reduction catalyst further comprises strontium.

8. The apparatus of claim 7, wherein the selective catalytic reduction catalyst further comprises from about 2 to about 35 percent strontium.

9. The apparatus of claim 1, wherein the at least one material characterized by increased surface acidity is selected from the group consisting of aluminum dioxide and zirconium dioxide which had surface properties modified by treatment with a material selected from the group consisting of sulfur, tungsten, phosphorus, silicon, titanium, and molybdenum, or any other materials which could modify surface acidity, and a zeolite.

10. The apparatus of claim 9, wherein the zeolite is selected from the group consisting of ZSM-5, zeolite beta, a ZSM-type zeolites, MCM-type zeolites, mordenite, faujasite, ferrierite, and combinations thereof.

11. The apparatus of claim 10, wherein the first component comprises manganese, the second component comprises cerium, and the at least one material characterized by increased surface acidity comprises ZSM-5.

12. The apparatus of claim 5, wherein the selective catalytic reduction catalyst comprises from about 10 to about 90 percent oxygen storage material on the basis of the oxides, and the oxygen storage material is selected from the group consisting of $Ce_{1-a}Zr_aO_2$ and $Ce_{1-c-d}Zr_cLan_dO_2$, wherein Lan is selected from the group consisting of Y, La, Pr, Nd, Sm, Eu, Gd, Ho, Yb and mixtures thereof.

13. The apparatus of claim 1, further comprising at least one inorganic oxide selected from the group consisting of alumina, silica, titania, and silica-alumina solutions, composites, and mixtures thereof.

14. The apparatus of claim 1, wherein a wash-coat loading of the selective catalytic reduction catalyst on the particulate filter comprises from about 5 to about 300 g/L.

15. A method for selective catalytic reduction of pollutants in an exhaust stream, removing particulates from an exhaust stream, and reduction of soot ignition temperature in a particulate filter, comprising:
   directing the exhaust stream through a particulate filter comprising a selective catalytic reduction catalyst, comprising:
      a first component selected from the group consisting of copper, chromium, cobalt, nickel, manganese, iron, niobium, and mixtures thereof;
      a second component selected from the group consisting of cerium, a lanthanide, a mixture of lanthanides, and mixtures thereof; and
      at least one material characterized by increased surface acidity.

16. The method of claim 15, wherein the particulate filter is a diesel particulate filter, and the method further comprising:
   adding ammonia to the exhaust stream; and
   introducing the exhaust stream to a diesel oxidation catalyst before adding ammonia to the exhaust stream.

17. The method of claim 16 wherein the source of ammonia comprises urea, ammonium hydroxide, ammonium formate, ammonia gas or other suitable source.

18. The method of claim 15 wherein the selective catalytic reduction catalyst further comprises an oxygen storage material.

19. The method of claim 15, wherein the selective catalytic reduction catalyst comprises from about 1 to about 20 percent of the first component calculated on the basis of the metal, from about 2 to about 35 percent of the second component calculated on the basis of the metal, and from about 10 to about 90 percent of the material characterized by increased surface acidity.

20. The method of claim 19, wherein the selective catalytic reduction catalyst further comprises strontium.

21. The method of claim 20, wherein the selective catalytic reduction catalyst further comprises from about 2 to about 35 percent strontium.

22. The method of claim 15, wherein the at least one material characterized by increased surface acidity is selected from the group consisting of aluminum dioxide and zirconium dioxide which had surface properties modified by treatment with a material selected from the group consisting of sulfur, tungsten, phosphorus, silicon, titanium, and molybdenum, or any other materials which could modify surface acidity, and a zeolite.

23. The method of claim 22, wherein the zeolite is selected from the group consisting of ZSM-5, zeolite beta, a ZSM-type zeolites, MCM-type zeolites, mordenite, faujasite, ferrierite, and combinations thereof.

24. The method of claim 23, wherein the first component comprises manganese, the second component comprises cerium, and the at least one material characterized by increased surface acidity comprises ZSM-5.

25. The method of claim 18, wherein the selective catalytic reduction catalyst comprises from about 10 to about 90 percent oxygen storage material on the basis of the oxides, and the oxygen storage material is selected from the group consisting of $Ce_{1-a}Zr_aO_2$ and $Ce_{1-c-d}Zr_cLan_dO_2$, wherein Lan is selected from the group consisting of Y, La, Pr, Nd, Sm, Eu, Gd, Ho, Yb and mixtures thereof.

26. The method of claim 15, further comprising at least one inorganic oxide selected from the group consisting of alumina, silica, titania, and silica-alumina solutions, composites, and mixtures thereof.

27. The method of claim 16, wherein a wash-coat loading of the selective catalytic reduction catalyst on the diesel particulate filter comprises from about 5 to about 300 g/L.

28. The apparatus of claim 1, wherein the particulate filter comprises a diesel particulate filter.

* * * * *